US008388487B2

(12) United States Patent
Fujii et al.

(10) Patent No.: US 8,388,487 B2
(45) Date of Patent: Mar. 5, 2013

(54) DIFFERENTIAL APPARATUS FOR VEHICLE

(75) Inventors: Noriyuki Fujii, Woluwe-Saint-Lambert (BE); Makoto Nishiji, Woluwe-Saint-Lambert (BE); Kunihiko Suzuki, Gamagoori (JP)

(73) Assignee: JTEKT Corporation, Osaka-shi (JP)

( * ) Notice: Subject to any disclaimer, the term of this patent is extended or adjusted under 35 U.S.C. 154(b) by 568 days.

(21) Appl. No.: 12/473,000

(22) Filed: May 27, 2009

(65) Prior Publication Data

US 2009/0305834 A1    Dec. 10, 2009

(30) Foreign Application Priority Data

Jun. 5, 2008 (JP) .................... 2008-148428
Jun. 12, 2008 (JP) .................... 2008-154379

(51) Int. Cl.
*F16H 48/06* (2006.01)
*F16H 48/22* (2006.01)

(52) U.S. Cl. ......... 475/249; 475/150; 475/338; 475/344

(58) Field of Classification Search .................. 475/150, 475/154, 249, 344, 338
See application file for complete search history.

(56) References Cited

U.S. PATENT DOCUMENTS

| 4,718,303 | A  | * | 1/1988  | Fogelberg     | 475/150 |
| 5,217,416 | A  |   | 6/1993  | Dick          |         |
| 5,916,052 | A  | * | 6/1999  | Dick          | 475/249 |
| 6,080,076 | A  | * | 6/2000  | Kwoka et al.  | 475/248 |
| 6,612,956 | B2 | * | 9/2003  | Fukuno et al. | 475/249 |
| 7,086,985 | B2 | * | 8/2006  | Nakajima      | 475/248 |
| 7,097,585 | B2 | * | 8/2006  | Nishiji       | 475/248 |
| 7,104,913 | B2 | * | 9/2006  | Yoshiyama et al. | 475/248 |
| 7,144,347 | B2 | * | 12/2006 | Kushino       | 475/249 |
| 7,361,117 | B2 | * | 4/2008  | Yamazaki et al. | 475/249 |
| 2005/0266954 | A1 | * | 12/2005 | Yoshimura  | 475/249 |
| 2006/0281599 | A1 |   | 12/2006 | Murakami et al. |    |

FOREIGN PATENT DOCUMENTS

| JP | 9-144845    | 6/1997 |
| JP | 2004-108517 | 4/2004 |
| JP | 2007-32822  | 2/2007 |

OTHER PUBLICATIONS

Japanese Office Action mailed Jul. 3, 2012, in Japanese Patent Application No. 2008-154379 filed Jun. 12, 2008 (with English Translation).

English translation of Chinese Office Action dated Dec. 26, 2012 in Chinese Patent Application No. 200910145913.1.

* cited by examiner

*Primary Examiner* — Justin Holmes
*Assistant Examiner* — Jacob S Scott
(74) *Attorney, Agent, or Firm* — Oblon, Spivak, McClelland, Maier & Neustadt, L.L.P.

(57) ABSTRACT

A differential apparatus has a planet carrier 2A rotated by driving torque from a driving source, a planetary gear 2B rotated for self-rotation around its own axis by receiving rotational force of the planet carrier 2A, a sun gear 2C and an internal gear 2D differentially distributing the rotational force to a pair of output shafts by receiving the rotational force of the planet carrier 2A from the planetary gear 2B, and a differential restricting mechanism 2 having an inner clutch plates 3A and an outer clutch plates 3B restricting a differential of the differential mechanism 3. The planet carrier 2A is disposed between the sun gear 2C and the internal gear 2D, and the sun gear 2C and internal gear 2D are respectively connected each other to be able to transmit torque through the inner clutch plates 3A and the outer clutch plates 3B.

12 Claims, 14 Drawing Sheets

DIFFERENTIAL APPARATUS FOR VEHICLE

INCORPORATION BY REFERENCE

The present application claims priority under 35 U.S.C. §119 to Japanese Patent Applications No. 2008-148428 filed on Jun. 5, 2008 and No. 2008-154379 filed on Jun. 12, 2008. The contents of these applications are incorporated herein by reference in their entirety.

BACKGROUND OF THE INVENTION

1. Field of the Invention

The present invention relates to a differential apparatus for a vehicle, and more particularly relates to the differential apparatus for the vehicle having a differential restricting mechanism to restrict a differential mechanism.

2. Description of the Related Art

It is well known for this kind of the differential apparatus for the vehicle as shown in a prior art as disclosed in a document of a Tokkai 2007-138983 disclosing a differential apparatus for a vehicle having a differential restricting mechanism restricting any differential of a differential mechanism by combining one of a pair of output shafts and an input shaft.

This conventional differential apparatus for the vehicle as the prior art mainly constitutes of a housing rotated with the input shaft as a input member, the differential mechanism distributing differentially rotational force from the housing, a main clutch restricting the differential of the differential mechanism, and a driving mechanism driving the main clutch.

The housing includes a front housing opening to one direction with a bottom and an annular rear housing mounted on the opening portion of the front housing, and is connected to the input shaft.

The differential mechanism includes a ring gear as the pair of output gears connecting the pair of output shafts respectively, a sun gear, a plurality of planetary gears as the input gear intermeshing with the ring gear and the sun gear, and a carrier supporting the plural planetary gears, and is accommodated in the housing. The differential mechanism is constructed to distribute differentially rotational force to the pair of output shafts.

The clutch includes outer clutch plates and inner clutch plates, and is disposed between an inner peripheral surface of the front housing and an outer peripheral surface of the ring gear. And the outer clutch plates and the inner clutch plates are frictionally engaged each other to connect the input shaft and the one output shaft of the pair of output shafts to restrict the differential of the differential mechanism. The outer clutch plates intermesh in spline with an inner peripheral surface of the front housing and the inner clutch plates intermesh in spline with an outer peripheral surface of the ring gear respectively and alternatively.

The driving mechanism includes an electromagnetic clutch, a pilot clutch driven by receiving the electromagnetic force of the electromagnetic clutch, a cam transforming rotational force from the housing to pressing force to the main clutch by the driving of the pilot clutch. The driving mechanism is disposed at a periphery of the pair of output shafts and accommodated in the housing. The driving mechanism is constructed to exert the pressing force from an output member of the cam to an output transmitting member including an annular cylindrical portion and a bottom portion, and then to the main clutch from the output transmitting member to engage frictionally the outer clutch plates and the inner clutch plates.

Upon the construction of the prior differential apparatus for the vehicle, when driving force from the engine of the vehicle is input to the housing, thereby to rotate the housing around a rotational axis. According to the rotation of the housing, the rotational force is transmitted to the plural planetary gears through the carrier, then to the ring gear and the sun gear through the plural planetary gears. Because the ring gear and the sun gear are connected to output shafts respectively, the driving force from the engine is differentially distributed according to a driving stage of the vehicle to be transmitted to the right and left output shafts.

In this case, when the electromagnetic clutch is energized, the electromagnetic force of the electromagnetic clutch drives the pilot clutch. Then, when the rotational force from the housing is received at the cam in a state of driving the pilot clutch, the rotational force is transformed to the pressing force by the cam so that the pressing force is exerted to the main clutch from the output member through the output transmitting member. Thereby, the pressing force makes the outer clutch plates and the inner clutch plates of the main clutch approach each other to engage them fictionally so that the housing and the ring gear, that is to say the input shaft and output shaft related to the ring gear are connected under the condition to be able to transmit the torque. Thereby, the differential of the differential mechanism is restricted.

However, in the prior art of the conventional differential device for the vehicle disclosed in the patent document, because the differential restricting force of the differential mechanism obtained by the clutch is generated between the housing and the ring gear, the restricting force is not obtained efficiently.

And also, in the prior art of the conventional differential device for the vehicle disclosed in the patent document, because the pressing force by the cam mechanism is transmitted from the opposite side of the carrier to the main clutch side, it needs an additional member like the output transmitting member penetrating the carrier to increase a number of parts and to make a whole apparatus complex, therefore to increase cost.

SUMMARY OF THE INVENTION

In view of the previously mentioned circumstances, it is an object of the present invention to provide a differential apparatus for a vehicle obtaining efficiently differential restricting force necessary and enough for a stable running performance and reducing the total cost and the total length of the apparatus.

In order to achieve the above and other objects, one feature of the present invention provides a differential mechanism having a input gear and a pair of output gears, and a differential restricting mechanism having a clutch, a carrier is disposed between the pair of output gears, and each of the pair of output gears are respectively connected through the clutch to be able to transmit torque. Thereby, compared to the prior art having the differential restricting force generated between the housing as the input gear and the ring gear as the output gear through the clutch, since the differential restricting force according to the present invention is generated between the pair of output gears through the clutch, the differential restricting force is obtained efficiently.

Second feature of the present invention provides a differential apparatus for a vehicle according to the first feature mainly including a pressing mechanism operating the differential restricting mechanism. Thereby, pressing force of the pressing mechanism is directly transmitted to the clutch and to the differential apparatus through the clutch to reduce a number of parts and to reduce a total cost of the apparatus.

Third feature of the present invention provides a differential apparatus for a vehicle mainly including a differential mechanism having a boss portion connected to the other of a pair of output shafts, the boss portion is movable to an axial direction relative to the other of the pair of output gears, the differential mechanism having a pressing force transmitting portion transforming rotational force from the differential mechanism to pressing force along an axial direction and transmitting said pressing force along said axial direction to an input gear and to at least one gear of the pair of output gears except for the other of the pair of output gears through the boss portion and a carrier. Thereby, since the boss portion is movable to the axial direction, the pressing force is not countervailed so that it is possible to obtain the differential restricting torque efficiently.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

First Embodiment

[Whole Construction of the Differential Apparatus for the Vehicle]

Figure 1:
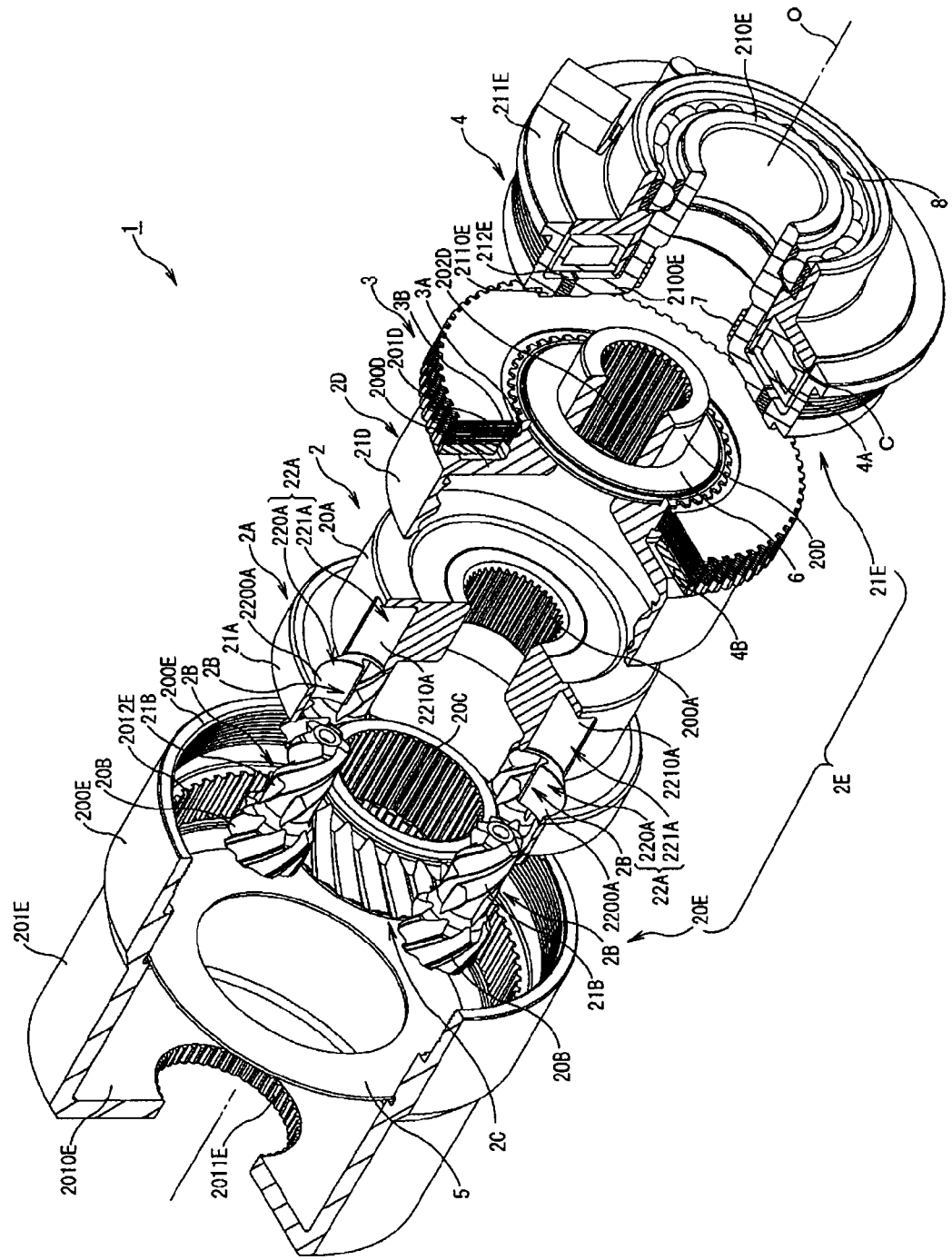
FIG. 1 is an oblique disassembling and partially cross sectional drawing explaining a differential apparatus for a vehicle according to first embodiment of the present invention.
Figure 2:
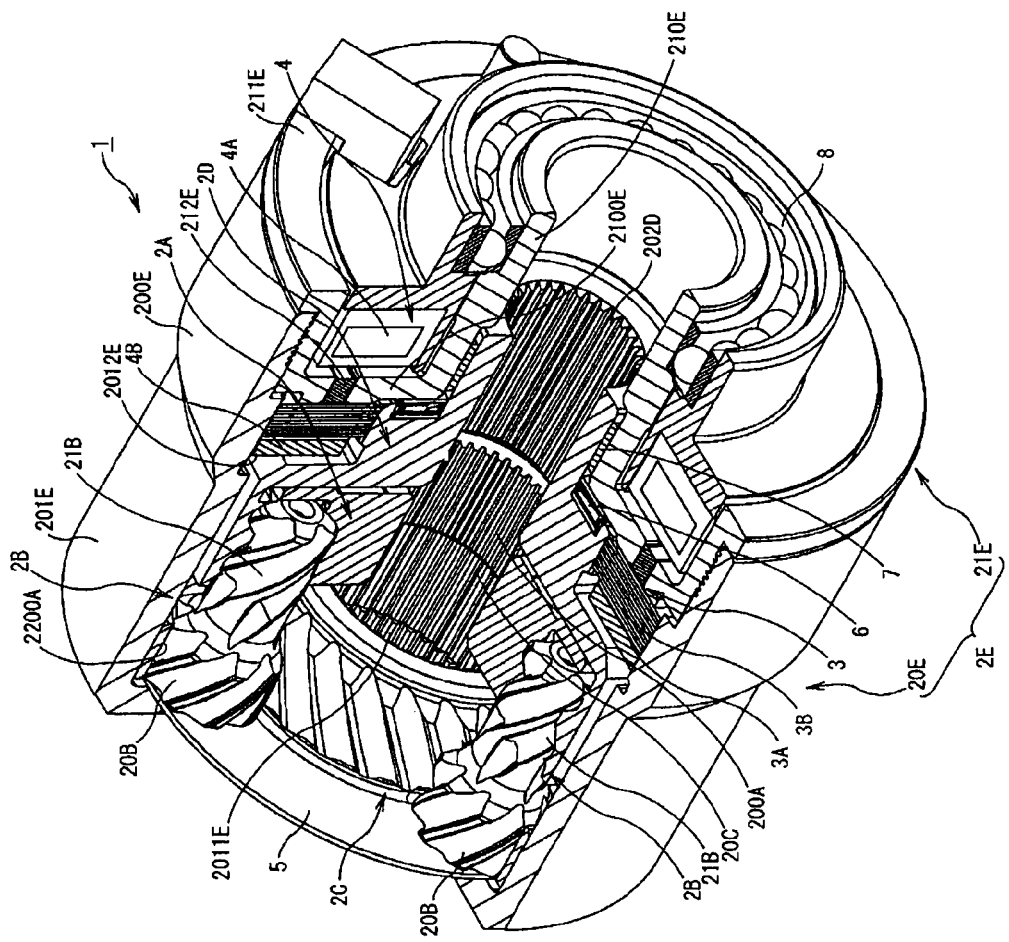
FIG. 2 is an oblique assembling and partially cross sectional drawing explaining a differential apparatus for a vehicle according to the first embodiment of the present invention.
Figure 3:
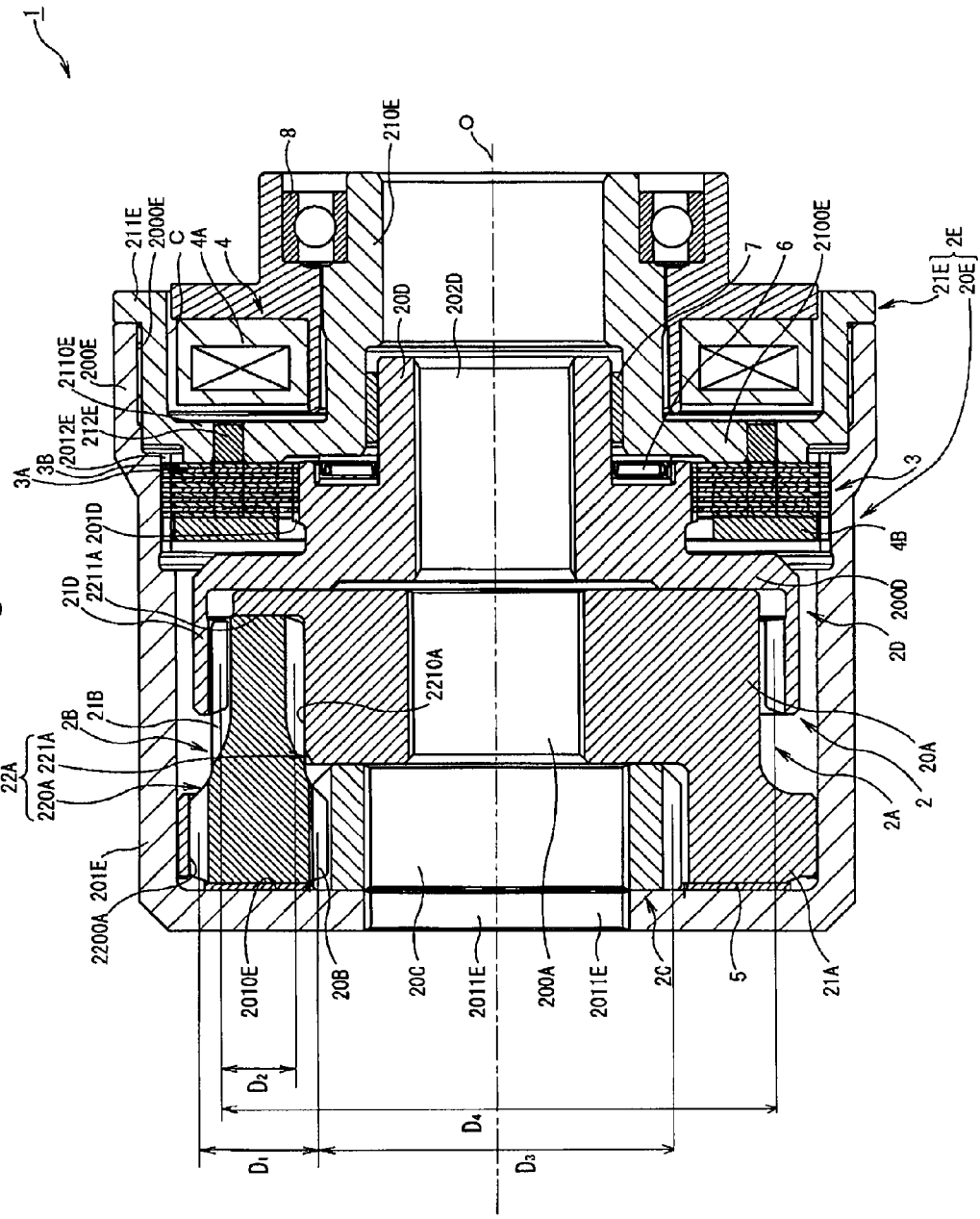
FIG. 3 is an cross sectional diagram explaining the differential apparatus for the vehicle according to the first embodiment of the present invention.
Figure 4:
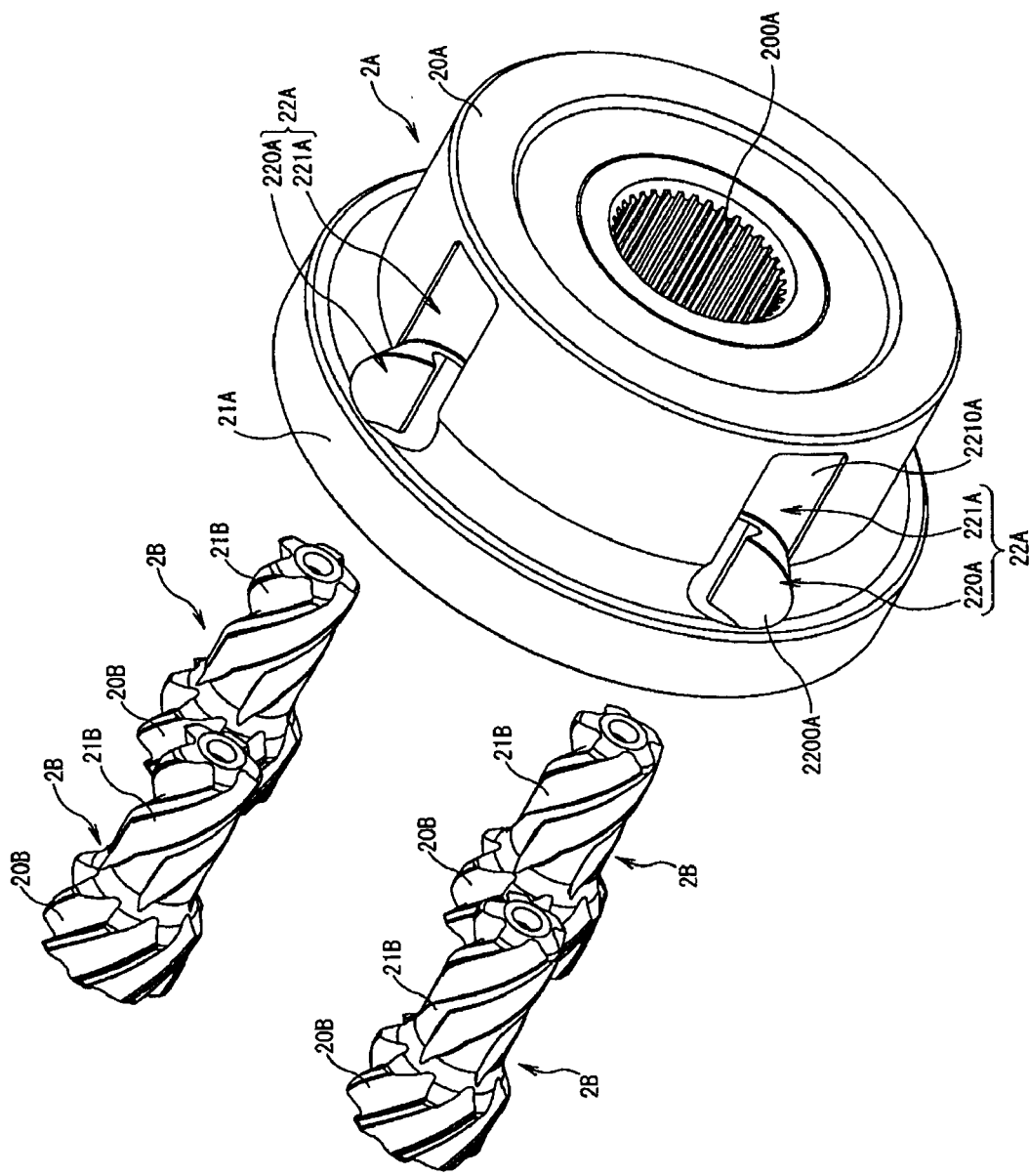
FIG. 4 is an oblique disassembling and partially cross sectional drawing explaining, from one side, a state of an input gear accommodating and supporting in a carrier of the differential apparatus for the vehicle according to the first embodiment of the present invention.
Figure 5:
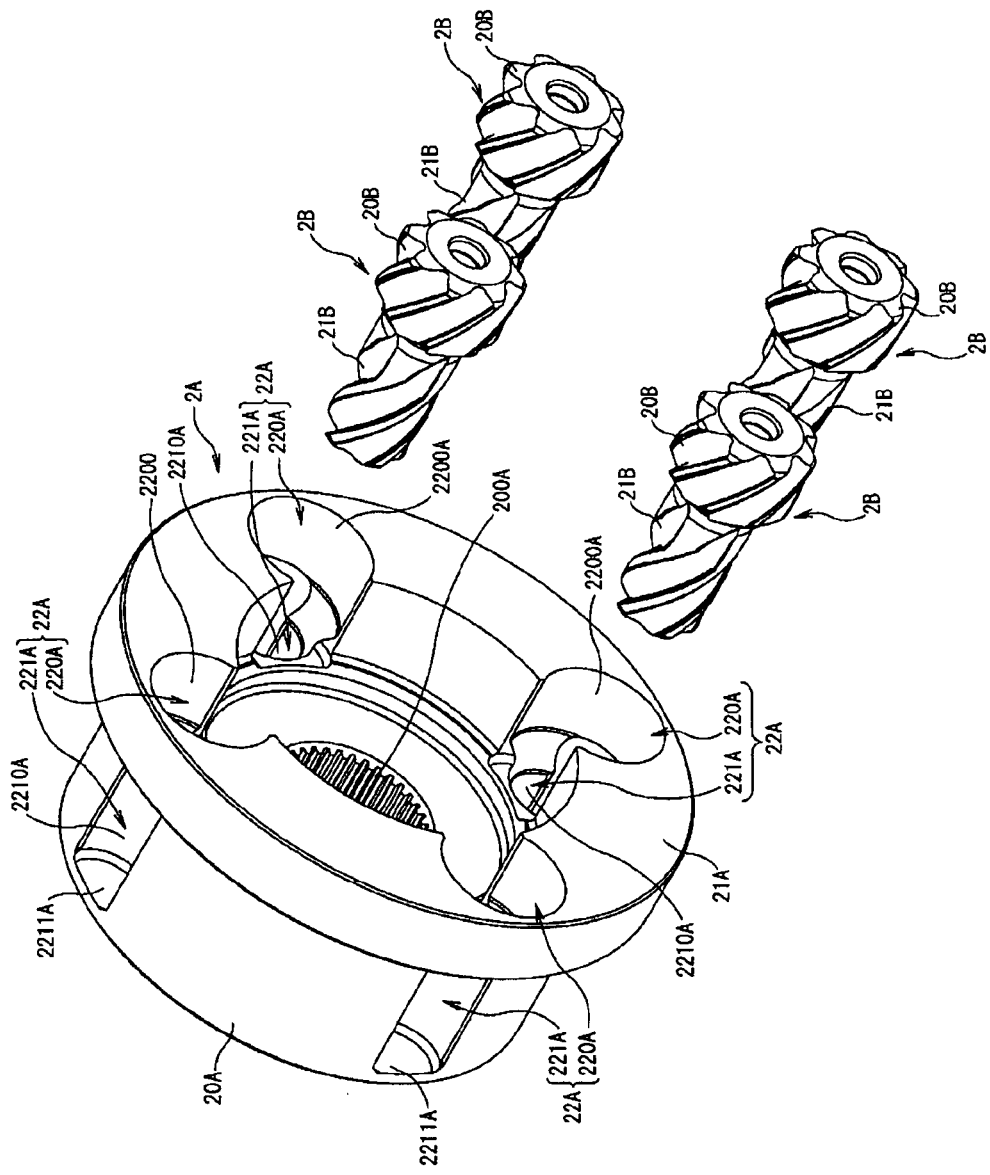
FIG. 5 is an oblique disassembling and partially cross sectional drawing explaining, from the other side, a state of an input gear accommodating and supporting in a carrier of the differential apparatus for the vehicle according to the first embodiment of the present invention.
Figure 6:
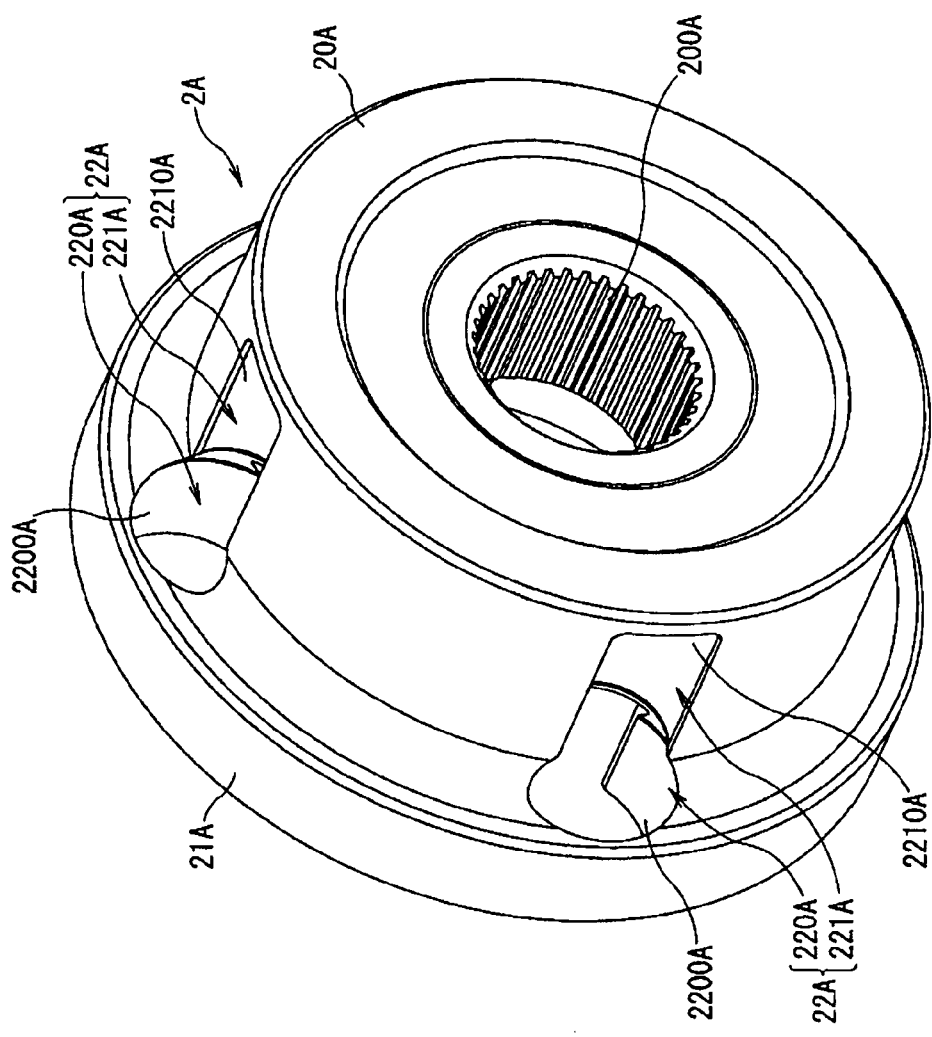
FIG. 6 is an oblique drawing explaining, from one side, a state of the carrier of the differential apparatus for the vehicle according to the first embodiment of the present invention.
Figure 7:
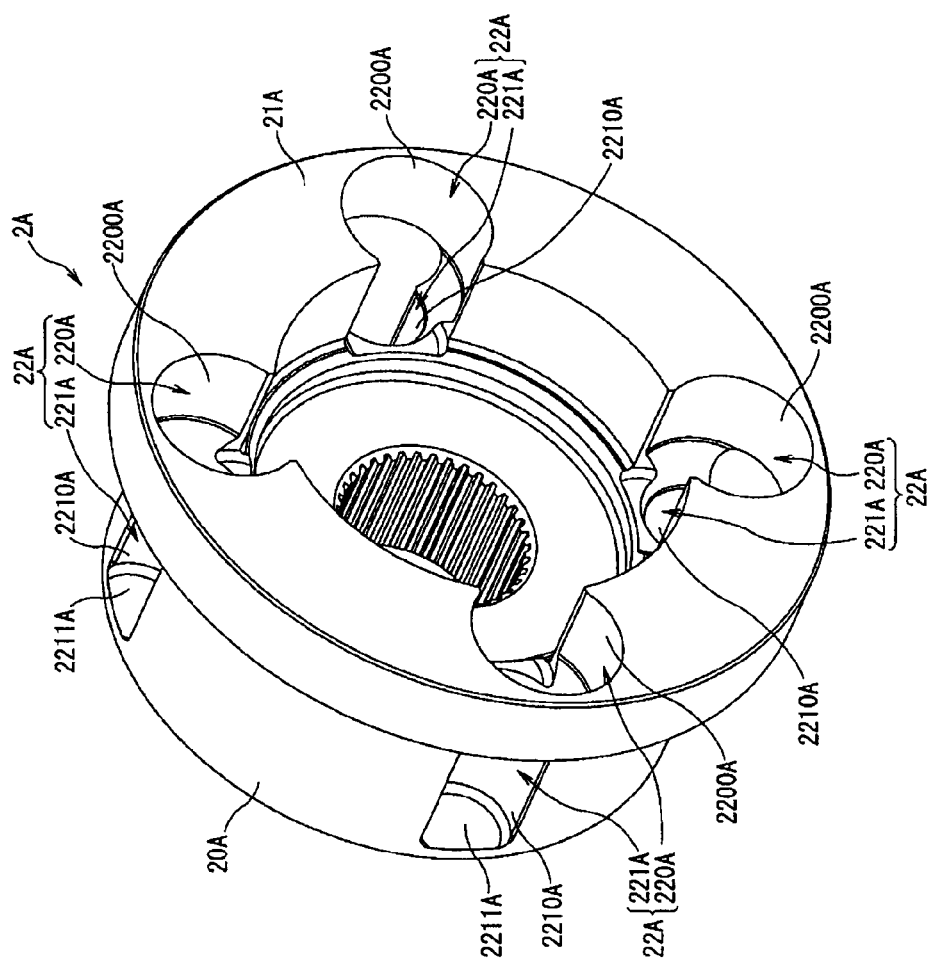
FIG. 7 is an oblique drawing explaining, from the other side, a state of the carrier of the differential apparatus for the vehicle according to the first embodiment of the present invention.

In FIG. 1 to FIG. 3, a numeral 1 shows the differential apparatus for the vehicle according to one embodiment of the present invention. The differential apparatus 1 is mainly constituted of a differential mechanism 2, a differential restricting mechanism 3 restricting a differential of the differential mechanism 2 and a pressing mechanism 4. The differential mechanism 2 is provided, for example, for distributing differentially driving torque or engine torque to a pair of unillustrated output shafts to front wheels and rear wheels as a center differential distributing driving force from a driving source of a four wheel driving vehicle to a front differential and a rear differential.

[Construction of the Differential Mechanism 2]

As shown in FIGS. 1 to 3, the differential mechanism 2 includes a planet carrier 2A as an input member, a plurality of planetary gears 2B receiving rotational force from the planet carrier 2A as an input gear, a sun gear 2C engaging in mesh with the plural planetary gears 2B as one output gear, an internal gear 2D engaging in mesh with the plural planetary gears 2B on the same axis to that of the sun gear 2C as the other output shaft, and a differential case 2E accommodating the internal gear 2D and a group of the sun gear 2C, the planet carrier 2A and the plural planetary gears 2B.

[Construction of the Planet Carrier 2A]

As shown in FIG. 1 to FIG. 7, the planet carrier 2A consists of a carrier base 20A and a carrier flange portion 21A and is disposed between the sun gear 2C and the internal gear 2D. And also the planet carrier 2A is a stepped annular cylindrical body having different inner diameters from each other and different outer diameters from each other respectively. The carrier flange 21A is continued to the carrier base 20A and is an annulus ring body opening to a rotational axis direction of planet carrier 2A. An outer diameter of the carrier flange 21A is set to be larger than that of the carrier base 20A and an inner diameter of the carrier flange 21A is set to be larger than that of the carrier base 20A. The planet carrier 2A is constructed to be rotated around a rotational axis O. In the planet carrier 2A is provided a gear accommodating and supporting portion 22A accommodating and supporting the plural planetary gears 2B rotatably for self rotation around its own axis respectively.

The gear accommodating and supporting portion 22A consists of a first accommodating hole 220A and a second accommodating hole 221A, and is disposed in both of the carrier base 20A and the carrier flange 21A.

The first accommodating hole 220A is opened to an inner radial direction on an inner surface of the planet carrier 2A, that is to an inner peripheral surface of the carrier flange 21A, at the sun gear side and to a parallel direction to the rotational axis O at the internal gear side. The first accommodating hole 22A is disposed in the carrier flange portion 21A. In an inner surface of the first accommodating hole 220A as a torque transmission surface is formed a first gear supporting surface 2200A having a curvature surface fit to a tooth edge surface of each of gear portions 20B of the plural planetary gears 2B.

The second accommodating hole 221A is opened to an outer radial direction on an outer surface of the planet carrier 2A, that is to an outer peripheral surface of the carrier base 20A, and to the parallel direction to the rotational axis O at the sun gear side. The second accommodating hole 221A is communicated to the first accommodating hole 221A and disposed in the carrier base 20A. In an inner surface of the second accommodating hole 221A as a torque transmission surface is formed a second gear supporting surface 2210A having a curvature surface fit to a tooth edge surface of the gear portions 21B of the plural planetary gears 2B. A bottom surface of the second accommodating hole 221A is consisted a third gear supporting surface 2211A, as a supporting surface at a carrier side in a fifth embodiment explained hereinafter, supporting slidably a free edge of the top end face of the gear portions 21B of the plural planetary gears 2B along its axial direction.

The carrier base 20A is a cylindrical body opening to the rotational axis direction of the planet carrier 2A. In an inner surface of the carrier base 20A is provided a spline fitting portion 200A connecting movably the unillustrated input shaft.

[Construction of the Plural Planetary Gears 2B]

Each of the plural planetary gear 2B is a helical gear, as shown in FIG. 1, having a large and a small gear portions 20B, 21B as shown in FIGS. 2, 3, and the large gear portion 20B has a pitch diameter D1 and the small gear portion 21B has a pitch diameter D2, each of which pitch diameters D1, D2 is different each other in D1>D2. Each of the gear portion 20B, 21B is a helical gear, each of which helical directions is same. Each of the plural planetary gears 2B is accommodated in both first and second accommodating holes 220A, 221A of the planet carrier 2A rotatably for self rotation around own axis of each of the plural planetary gears 2B.

The each gear portion 20B intermeshes with the sun gear 2C and is accommodated in the first accommodating hole 220A rotatably for self rotation around its own axis. Therefore, rotational force of the planetary carrier 2A is transmitted to the output shaft connecting the front wheels to a left side direction in FIG. 3. Between the top end face of the gear portion 20B and a bottom portion 2010E of a front case 20E of the differential case 2E is inserted an annular thrust washer 5 positioned at an outer peripheral portion of the sun gear 2C. A number Z1 of teeth of the gear portions 20B is set to be larger than a number Z2 of teeth of the gear portions 21B, that is to say Z1>Z2. In this embodiment, the number Z1 is set to be eight and the number Z2 is set to be five.

Figure 9:
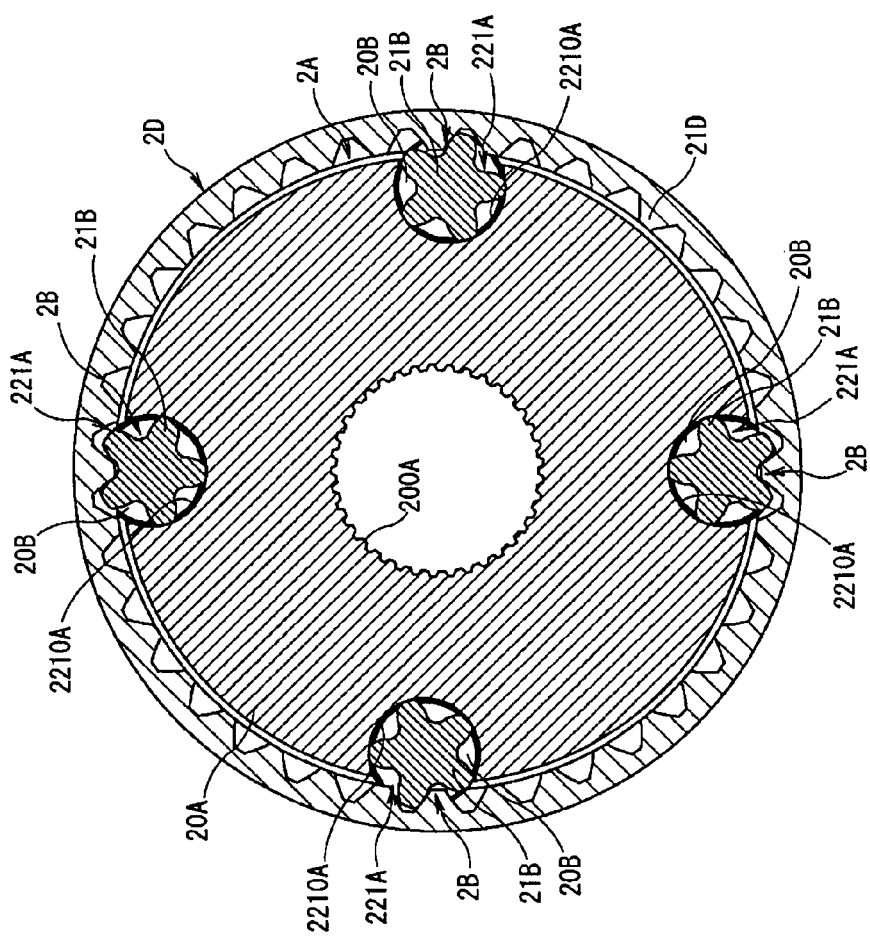
FIG. 9 is a cross sectional drawing explaining a state of an intermeshing of the input gear with the other gear of output gears of the differential apparatus for the vehicle according to the first embodiment of the present invention.

Each of the gear portions 21B is intermeshed with the internal gear 2D as shown in FIG. 3 and FIG. 9 and is accommodated in the second accommodating hole 221A rotatably for self-rotation around its own axis. Therefore, the rotational force is transmitted to the output shaft connecting the rear wheels to a right side direction in FIG. 3.

[Construction of the Sun Gear 2C]

Figure 8:
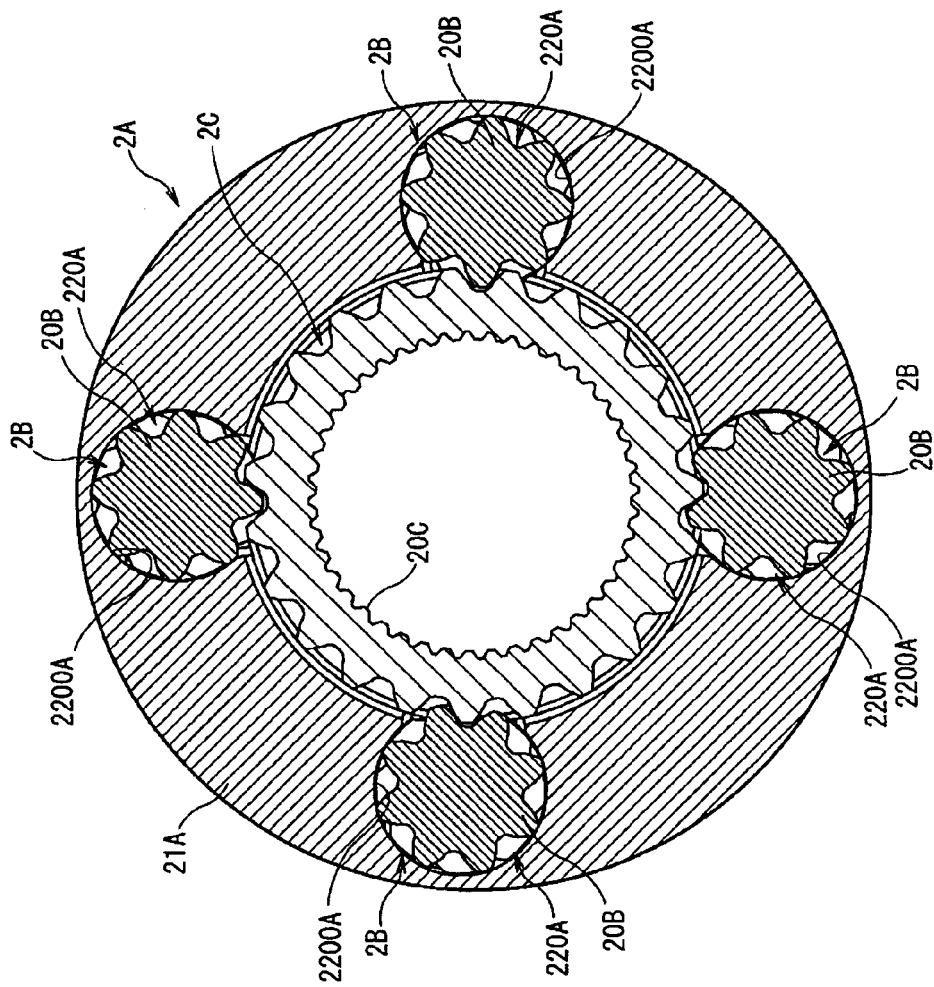
FIG. 8 is a cross sectional drawing explaining a state of an intermeshing of the input gear with one gear of output gears of the differential apparatus for the vehicle according to the first embodiment of the present invention.

As shown in FIG. 3 and FIG. 8, the sun gear 2C intermeshes with the gear portions 20B of the plural planetary gears 2B and is mounted rotatably around the axis of the internal gear 2D. The sun gear 2C is accommodated within the planet carrier 2A and is an annular cylindrical body with a helical gear having its rotational axis same to the rotational axis O. The rotational force of the planetary carrier 2A received by the sun gear 2C is transmitted to the output shaft connecting the front wheels to the left side direction in FIG. 3. In an inner surface of the sun gear 2C is provided a spline fitting portion 20C connecting movably the unillustrated output shaft for front wheels. A pitch diameter D3 and a number Z3 of teeth of the sun gear 2C are set to be respectively larger than those of the pitch diameter D1 and the number Z1 of teeth of the gear portions 20B of the plural planetary gears 2B.

[Construction of the Internal Gear 2D]

As shown in FIG. 3 and FIG. 9, the internal gear 2D consists of a boss portion 20D and a gear portion 21D, and has a helical gear intermeshing with the gear portions 21B of the plural planetary gears 2B. The internal gear 2D is rotatably installed around the axis of the planet carrier 2A and is supported by the first case element 210E of the rear case 21E of the differential case 2E through a needle bearing 6. The internal gear 2D is an annular cylindrical body having its axis same to the rotational axis O. The rotational force from the gear portion 21B of the plural planetary gears 2B is received by the internal gear 2D to be transmitted to the output shaft connecting the rear wheels to the right side direction in FIG. 3.

The boss portion 20D is, as shown in FIG. 3, a stepped annular cylindrical body having different outer diameters from each other respectively. The planetary carrier 2A is disposed between the boss portion 20D and the sun gear 2C. On an outer peripheral surface, having the larger diameter, of both outer peripheral surfaces of the boss portion 20D are mounted a flange portion 200D and a spline fitting portion 201D. The flange portion 200D includes a flange edge surface faced to one end surface at opposite side of the planet carrier 2A from the other end surface at sun gear side. The spline fitting portion 201D is adjacent to the flange portion 200D with a predetermined distance along the axis direction. On an inner surface of the boss portion 20D is mounted a spline fitting portion 202D connecting movably the output shaft for the rear wheels.

As shown in FIG. 3, the gear portion 21D formed as a body with the boss portion 20D through the flange portion 200D is, as shown in FIG. 3, disposed out of an outer periphery of the planet carrier 2A to engage in mesh with the gear portions 21B of the plural planetary gears 2B. A pitch diameter D4 and a number Z4 of teeth of the gear portion 21D are set to be larger than the pitch diameter D3 and the number Z3 of teeth of the sun gear 2C. Thereby, since the equation of D3/D1<D4/D2 is established in the pitch diameters of the gear portions 20B of the plural planetary gears 2B as input gears and the pitch diameters of the sun gear 2C and the internal gear 2D as output gears, rotational torque transmitted from the engine to the internal gear 2D through the gear portions 21B of the plural planetary gears 2B is larger than rotational torque transmitted from the gear portions 20B of the plural planetary gears 2B to the sun gear 2C. In the first embodiment of the present invention, the pitch diameters D1 to D4 is set to satisfy the equation of $(D4/D2)/(D3/D1) \geq 2$ so that torque distributed to the internal gear 2D is two times more than torque distributed to sun gear 2C.

[Construction of the Differential Case 2E]

As shown in FIG. 1 to FIG. 3, the differential case 2E consists of a front case 20E and a rear case 21E. The front case 20E is an annular cylindrical body with a bottom to open to one direction along the rotational axis O. The rear case 21E is an approximately annulus ring body covering the opened portion, identified as a parts inserting inlet 2000E described hereinafter, of the front case 20E. To the bottom of the front case 20E is welded the opposite side surface of the sun gear 2C to a side surface at the planet carrier side along an axis of the sun gear 2C. The differential case 2E is a hollow body as a whole to accommodate therein the differential mechanism 2, the differential restricting mechanism 3 and the pressing mechanism 4.

The front case 20E consists of large and small stepped cylindrical bodies 200E, 201E, with the bottom, having different inner diameters from each other and different outer diameters from each other respectively.

One cylindrical portion 200E includes a parts inserting inlet 2000E at the rear case side and is disposed in one side of the front case 20E along the axis direction.

The other cylindrical portion 201E is disposed in the other side of the front case 20E along the axis direction. In the cylindrical portion 201E are equipped a bottom portion 2010E and a penetrating hole 2011E. The bottom portion 2010E is faced through the thrust washer 5 to the top end face of the gear portions 20B of the plural planetary gears 2B. The penetrating hole 2011E has a spline fitting portion and penetrates through the bottom portion 2010E to be communicated within the sun gear 2C. On an inner peripheral surface of the cylindrical portion 201E is provided a spline fitting portion 2012E positioned adjacent to the cylindrical portion 200E.

The rear case 21E consists of first to third case elements 210E to 212E and is threaded into the parts inserting inlet 2000E.

The first case element 210E includes a flange portion 2100E faced to the flange portion 200D of the boss portion 20D of the internal gear 2D on an outer peripheral surface and is an annular cylindrical body made of a magnetic material such as soft iron etc. as a whole. A needle bearing 7 is inserted between an inner peripheral surface of the first case element 210E and an outer peripheral surface of the boss portion 20D of the internal gear 2D.

The second case element 211E includes a flange portion 2110E faced to the flange portion 200D of the boss portion 20D of the internal gear 2D and is an annular cylindrical body made of a magnetic material such as a soft iron etc. as a whole. There exists an annular space C between an inner surface of the second case element 211E and an outer surface of the first case element 210E.

The third case element 212E is installed between the flange portion 2100E of the first case element 210E and the flange portion 2110E of the second case element 211E and is an annulus ring body made of a non-magnetic material such as a stainless steel etc. as a whole for the purpose of connecting case elements.

[Construction of the Differential Restricting Mechanism 3]

As shown in FIG. 1 to FIG. 3, the differential restricting mechanism 3 is a frictional clutch including a plurality of inner clutch plates 3A and a plurality of outer clutch plates 3B and is disposed between the inner surface of the front case 20E of the differential case 2E and the outer surface of the boss portion 20D of the internal gear 2D. The differential restricting mechanism 3 is constructed to connect the sun gear 2C/the differential case 2E and the internal gear 2D for torque transmission in a way of connecting and disconnecting and to restrict the differential of the differential mechanism 2.

Each of plural inner clutch plates 3A and each of plural outer clutch plates 3B are disposed alternatively along the rotational axis O and are annulus ring frictional plates as a whole.

The plural inner clutch plates 3A are connected movably to the spline fitting portion 201D of the boss portion 20D of the internal gear 2D along the rotational axis O.

The plural outer clutch plates 3B are connected movably to the spline fitting portion 2012E of the front case 20E of the differential case 2 along the rotational axis O.

[Construction of the Pressing Mechanism 4]

As shown in FIG. 1 to FIG. 3, the pressing mechanism 4 includes a magnetic clutch having an electromagnet 4A and an armature 4B, and is disposed at a rear output axis side of the internal gear 2D of the differential mechanism 2. The pressing mechanism 4 is constructed to act to the differential mechanism 3 to press each next plate of the inner clutch plates 3A and the outer clutch plates 3B for frictional movement.

The electromagnet 4A is disposed in the annular space C of the rear case 21E and is relatively rotatably mounted on an outer peripheral surface of the first case element 210E through a ball bearing 8.

The armature 4B is disposed out an outer peripheral surface of the boss portion 20D between the flange portion 200D of the boss portion 20D of the internal gear 2D and the differential restricting mechanism 3, and is connected to the spline fitting portion 2012E of the cylindrical portion 201E of the front case 20E of the differential case 2E. The armature 4B is constructed to be moved by electro magnetic force of the electromagnet 4A along the rotational axis O.

[Operation of the Differential Apparatus 1 for the Vehicle]

First of all, when torque from the engine of the vehicle is input to the planet carrier 2A, it is rotated around the rotational axis O. Upon the rotation of the planet carrier 2A, rotational force is transmitted to the plural planetary gears 2B and further transmitted to the sun gear 2C through the gear portion 20B of the plural planetary gear 2B and to the internal gear 2D through the gear portion 21B of the plural planetary gear 2B respectively. Because the sun gear 2C is intermeshed with the unillustrated output shaft for the front wheels and the internal gear 2D is intermeshed with the unillustrated output shaft for the rear wheels in spline fitting respectively, torque from the engine is transmitted to the right and left output shafts at the front and rear wheels sides through the planet carrier 2A, the plural planetary gears 2B, the sun gear 2C and the internal gear 2D.

Where the vehicle is driven in straight line and there is no slip between the road and each tire wheel on the front and rear tire shafts, the planet carrier 2A is rotated around the rotational axis O and the plural planetary gears 2B are revolved, without self-rotation, around the center axes of the sun gear 2C and the internal gear 2D upon the transmission of the torque from the engine to the planet carrier 2A. The plural planetary gears 2B, the sun gear 2C and the internal gear 2D are rotated as a body with the planet carrier 2A so that torque from the engine is transmitted equally to front and rear output shafts on a basis of D3/D1 (front) to D4/D2 (rear) of distribution ratio basically but in adjusting instantly any unbalance in road reactions within the differential restricting torque distribution, thereby to rotate each of front and rear output shafts at the same rotational number.

In the first embodiment of the present invention, since values of D1 to D4 are set to satisfy the equation of $(D4/D2)/(D3/D1) \geq 2$, torque distributed to the rear wheels is two times more than torque distributed to the front wheels. By the way of the torque distribution according to the equation, the rear wheels can be performed in drift out according to an amount of a position of an accelerator pedal in a corner driving so that the vehicle can be turned at high speed without being pushed out by cornering force or centrifugal force. This driving technique is good for a superior driver in sporty driving. However, where the position of the accelerator pedal is large or frictional coefficient measurement of a road is low, it tends to increase an amount of a over-steering, thereby to generate spinning of the vehicle. In this situation, the pressing mechanism 4 is operated according to yaw rate detected by a yaw rate sensor and the running status of the vehicle based on a vehicle speed or a steering angle so that it acts sufficient differential restricting force between the internal gear 2D and the sun gear 2C to perform a stable running of the vehicle. Thereby, torque distributed more to the rear wheels is returned to the front wheels to increase the amount of the torque distributed to the front wheels and to reduce the amount of the torque to the rear wheels, making the stable running for the vehicle.

In this first embodiment of the present invention, differential restricting torque is generated on the sun gear 2C and the internal gear 2D as output shafts according to operations shown in next items of 1 to 3 in the status that the engine torque is input to the planet carrier 2A.

1. Where the plural planetary gears 2B are rotated for self-rotation around its own axis during the torque acts on, because each of tooth edge faces of the gear portions 20B and the gear portion 21B of the plural planetary gears 2B slides on the first gear supporting surface 2200A and the second gear supporting surface 2210A of the first accommodating hole 220A and the second accommodating hole 221A of the planet carrier 2A, there occurs frictional resistance between the first gear supporting surface 2200A, the second gear supporting surface 2210A and tooth edges of the plural planetary gears 2B, so that the differential restricting torque is generated at the sun gear 2C and the internal gear 2D by these frictional forces.

2. On the other hand, by the self-rotation of the plural planetary gears 2B around each of their own axes, thrust force is generated on each of the intermeshing engagement surfaces between the plural planetary gears 2B and the sun gear 2C/the internal gear 2D along the rotational axis O. In this situation, each of top end faces of the gear portions 21B or top end faces of the gear portions 20B of the plural planetary gears 2B slides also on the third gear supporting surface 2211A of the second accommodating hole 221A of the planet carrier 2A or on the bottom portion 2010E of the front case 20E, and each of the sun gear 2C and the internal gear 2D is moved to be separated or pushed from each other. In this instance, frictional resistance is generated between the sliding portions moved by the thrust force, therefore, the differential restricting torque is generated at the sun gear 2C and the internal gear 2D by this second frictional resistance.

3. Where the electromagnet 4A of the pressing mechanism 4 is excited, the magnetic circuit is closed through the front case 20E, the rear case 21E and the armature 4B so that the magnet force moves the armature 4B to the rear case side, that is the electromagnet side. By the movement of the armature 4B, the inner clutch plates 3A and the outer clutch plates 3B of the differential restricting mechanism 3 are pressed to the rear case side so that the inner clutch plates 3A and the outer clutch plates 3B are approached relatively each other to be contacted in frictional engagement. By this frictional engagement, the differential case 2E and the internal gear 2D, that is to say the sun gear 2C and the internal gear 2D are connected in torque transmission through the inner clutch plates 3A and the outer clutch plates 3B. Therefore, the differential restricting torque is generated at the sun gear 2C and the internal gear 2D by this third frictional resistance.

[Effects of the First Embodiment]

The differential apparatus for the vehicle according to the first embodiment of the present invention achieves next effects.

1. Since the differential mechanism 2 is disposed between the sun gear 2C and the internal gear 2D as a pair of the output shafts, the differential restricting force of the differential mechanism 2 obtained by the inner clutch plates 3A and the outer clutch plates 3B of the differential mechanism 2 is generated between the pair of output gears, that is the sun gear 2C and the internal gear 2D, the differential restricting force is efficiently obtained. Namely, because the sun gear 2C and the internal gear 2D are rotated reversely each other through the inner clutch plates 3A and the outer clutch plates 3B at the generation of the differential, torque transmitted from the internal gear 2D to the sun gear 2C through the inner clutch plates 3A and the outer clutch plates 3B is operated to restrict the rotation of the sun gear 2C and torque transmitted from the sun gear 2C to the internal gear 2D through the inner clutch plates 3A and the outer clutch plates 3B is operated to restrict the rotation of the internal gear 2D. Thereby, the differential restricting force of the differential mechanism 2 is able to be double.

2. Since the pressing force by the pressing mechanism 4 is directly transmitted to the clutch plates, there is no need to have any output transmitting members etc. to reduce a number of parts and to simplify the whole constructions so that the total cost should be reduced. And also, it is possible for the present invention to improve the responsibility of the differential restricting force against the current and to achieve elimination of any torque escape that the differential apparatus using the cam mechanism can not eliminate.

3. Since each tooth edge surface of the gear portions 20B is supported except for a portion faced to inner radial direction of the planet carrier 2A and each tooth edge surface of gear portions 21B is supported except for a portion faced to outer radial direction of the planet carrier 2A, the plural planetary gears 2B are not inclined by reaction force based on intermeshing with the sun gear 2C and the internal gear 2D. Thereby, it is eliminated for the plural planetary gears 2B to be contacted with the opening edge portions on the first accommodating hole 220A and the second accommodating hole 221A so that any generation of wear is restricted on the plural planetary gears 2B and the gear accommodating and supporting portion 22A.

4. Since thrust force generated at each of gears of the differential mechanism 2 does not affect the differential restricting force generated at the differential restricting mechanism 3, the differential restricting force according to the current charged in the electromagnet 4A is obtained precisely. That is, it is possible for the present invention to control the increasing and decreasing current on the electromagnet 4A based on the vehicle running state of each wheel speed, the steering angle, the yaw rate, etc. so that the running stability of the vehicle is increased precisely.

Second Embodiment of the Present Invention

The second embodiment of the differential apparatus for the vehicle according to the present invention will be explained in referring to FIG. 10 hereinafter. A numeral in FIG. 10 same to the numeral in FIG. 3 is the same member to be identified by the same numeral and eliminated the explanation in detail.

Figure 10:
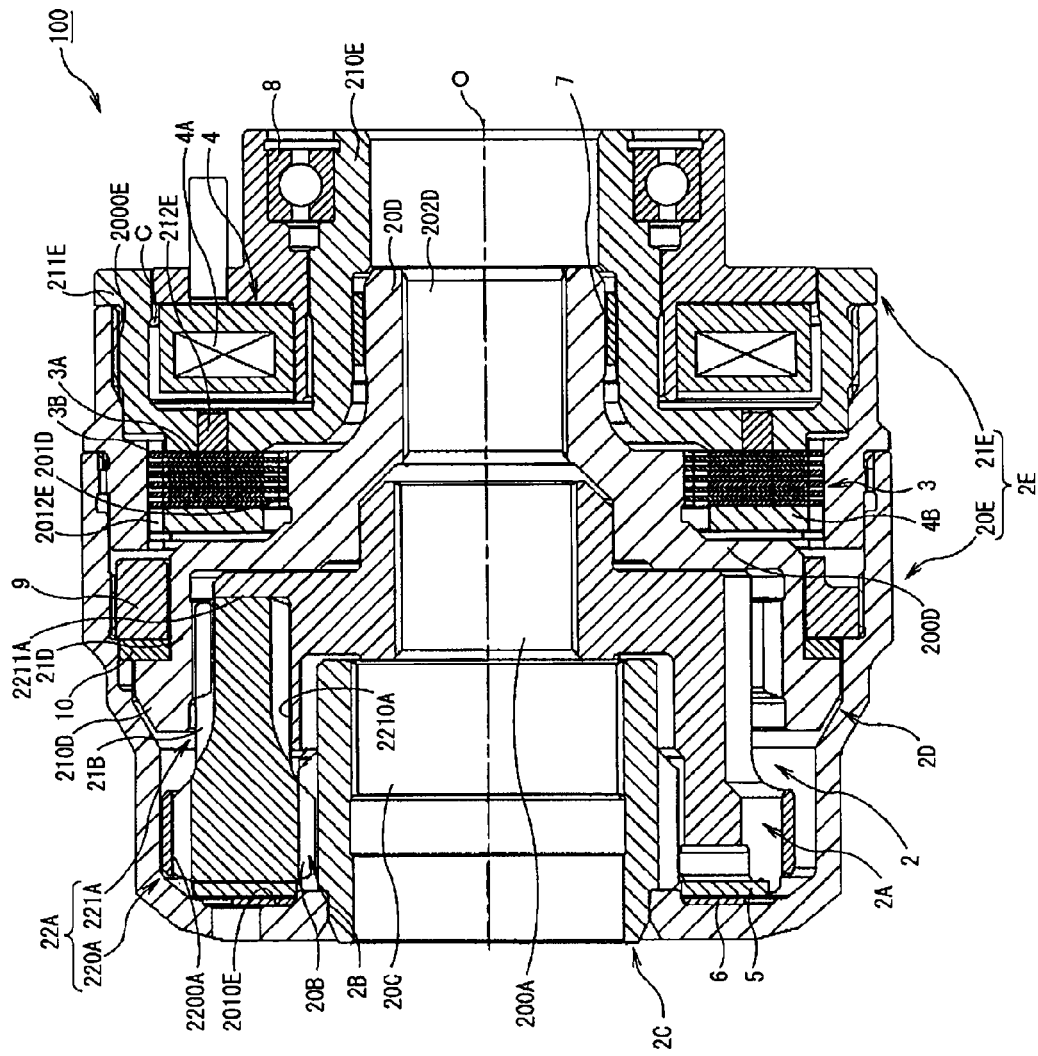
FIG. 10 is an cross sectional diagram explaining the differential apparatus for the vehicle according to second embodiment of the present invention.

As shown in FIG. 10, it is for a feature of the differential apparatus 100 for the vehicle of the second embodiment to provide a ring bolt 9 as a movement restricting member restricting any movement of the internal gear 2D to a side of clutches along the rotational axis O.

The ring bolt 9 is screwed into an inner peripheral surface of the case element on the front case 20E of the differential case 2E in the side of the rear case. The ring bolt 9 is faced to the flange portion 210D formed as a body in a peripheral surface of the gear portion 21D of the internal gear 2D. A thrust washer 10 is inserted between the ring bolt 9 and the flange portion 210D.

The operation of the second embodiment of the present invention will be described partially hereinafter. When the engine torque is input to the planet carrier 2A, the differential restricting torque is generated at the output gears of the sun gear 2C and the internal gear 2D as shown in the first embodiment and next differential restricting torque is generated as explained hereinafter.

Where the plural planetary gears 2B is rotated for self-rotation around their own axes upon reception of the engine torque from the planet carrier 2A, thrust force generated at the intermeshing surface of each of the plural planetary gears 2B, the sun gear 2C and the internal gear 2D along the rotational axis O moves the plural planetary gears 2B to a direction approaching to the bottom portion 2010E of the front case 20E of the differential case 2E and also moves the sun gear 2C and the internal gear 2D to a direction of the pressing mechanism. Thereby, the flange portion 210D of the internal gear 2D is pressed to the ring bolt 9 through the thrust washer 10 so that frictional resistance is generated between the thrust washer 10 and the internal gear 2D, therefore, to generate the differential restricting torque at the sun gear 2C and the internal gear 2D by this frictional resistance.

[Effects of the Second Embodiment]

The differential apparatus for the vehicle according to the second embodiment of the present invention achieves the same effects 1 to 4 to that of the first embodiment of the present invention.

While the second embodiment is described in the condition that the equation of D3/D1<D4/D2 is satisfied by setting pitch diameters of the input gears of the gear portions 20B, 21B of the planetary gear 2B and pitch diameters of the output gears of the sun gear 2C and the internal gear 2D, however, the invention is not limited to the construction, but it may be set the condition that the pitch diameter of each gears is set to satisfy an equation of D3/D1=D4/D2. In this case, you can set a Torque Bias Ratio (TBR) 50 to 50 where TBR is a ratio of torque transmitted to the sun gear to torque transmitted to the internal gear, therefore, same amount of torque is transmitted to the sun gear and the internal gear respectively.

And also, it may be set the condition that the equation of D3/D1>D4/D2 is satisfied by setting pitch diameters of the input gears of the gear portions 20B, 21B of the planetary gear 2B and pitch diameters of the output gears of the sun gear 2C and the internal gear 2D. In this case, the torque transmitted to the internal gear is smaller than the torque transmitted to the sun gear.

Third Embodiment of the Present Invention

The third embodiment of the differential apparatus for the vehicle according to the present invention will be explained in referring to FIG. 11 hereinafter. A numeral in FIG. 11 same to the numeral in FIG. 3 is the same member to be identified by the same numeral and eliminated the explanation in detail.

Figure 11:
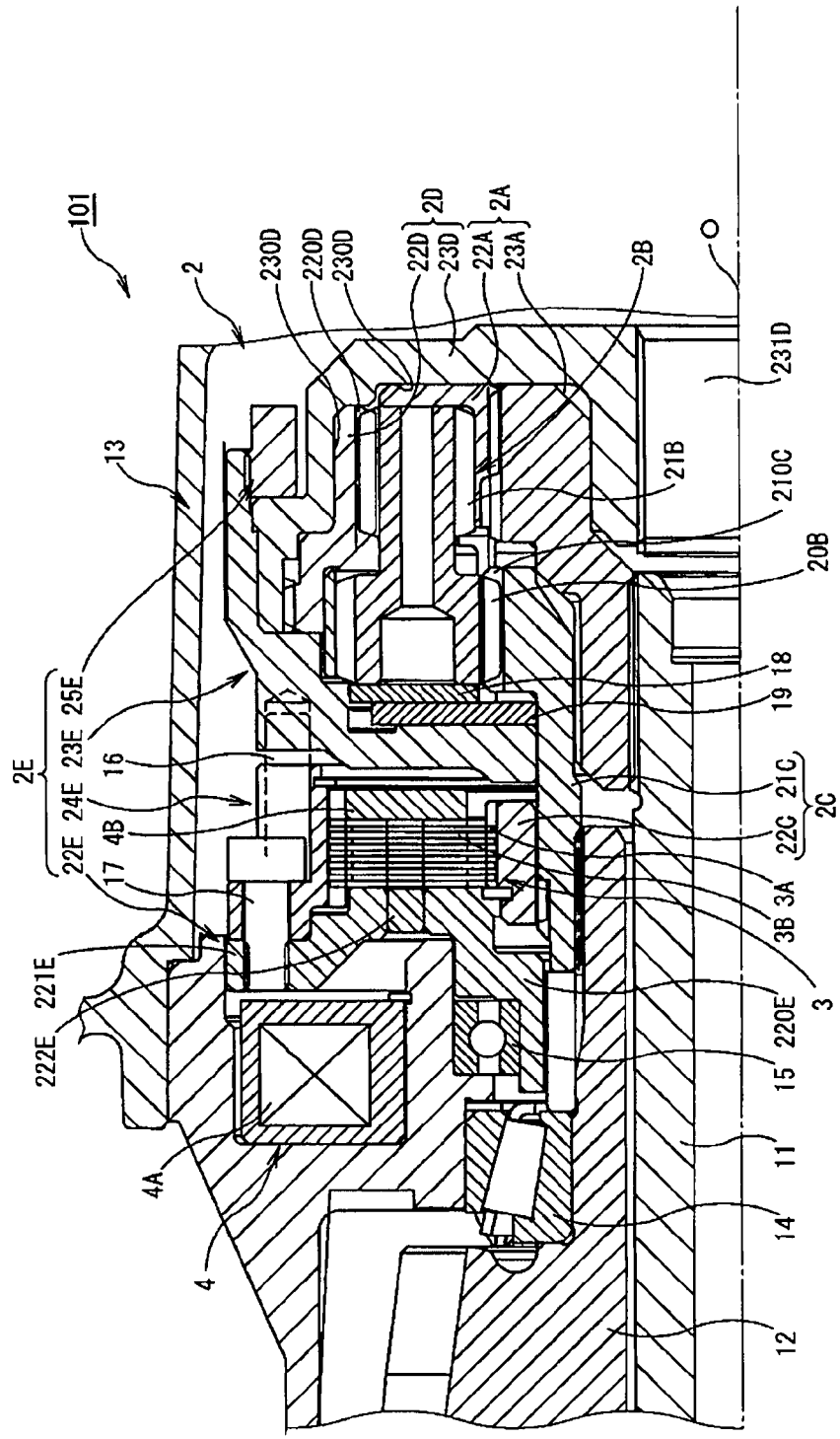
FIG. 11 is an cross sectional diagram explaining the differential apparatus for the vehicle according to third embodiment of the present invention.

As shown in FIG. 11, it is for a feature of the differential apparatus 101 for the vehicle of the third embodiment to provide the internal gear 2D fixed to the differential case 2E, and the sun gear 2C connected with the internal gear 2D of the differential case 2E each other to be able to transmit torque through the differential restricting mechanism 3.

The planet carrier 2A includes a gear accommodating and supporting portion 22A accommodating and supporting the plural planetary gears 2B rotatably for self-rotation around their own axes respectively and a carrier annular cylindrical portion 23A fit in spline to an inner peripheral surface of the gear accommodating and supporting portion 22A and to an outer peripheral surface of the input shaft 11. The planet carrier 2A is disposed between the differential case 2E and the internal gear 2D. The gear accommodating and supporting portion 22A is disposed on an outer peripheral surface of the planet carrier 2A and the carrier annular cylindrical portion 23A is disposed on an inner peripheral surface of the planet carrier 2A.

The sun gear 2C includes an inner annular cylindrical body 21C and an outer annular cylindrical body 22C, each of opening diameters of which is different respectively. The sun gear 2C is connected to the unillustrated output shaft for the front wheel through the front output gear 12. The inner annular cylindrical body 21C has a gear portion 210C intermeshing with the gear portions 20B of the plural planetary gears 2B and is mounted rotatably around the axis of the internal gear 2D, that is the rotational axis O. The outer annular cylindrical body 22C is connected in spline with the outer peripheral surface of the inner annular cylindrical body 21C.

The front output gear 12 is disposed in outer peripheral area of the input shaft 11 and supported rotatably in the transfer case 13 through the taper roller bearing 14.

The internal gear 2D includes an inner annular cylindrical body 22D and an outer annular cylindrical body 23D, each of opening diameters of which is different respectively. The internal gear 2D is connected to the unillustrated output shaft for the rear wheel. The internal gear 2D is constructed to accommodate a part of the planet carrier 2A intermeshing with the input shaft 11 for the front wheel. The inner annular cylindrical body 22D has a gear portion 220D intermeshing with the gear portions 21B of the plural planetary gears 2B and is mounted rotatably around the rotational axis O. The inner annular cylindrical body 22D is an annular cylindrical body without any bottom and is opened to two right and left directions along the axis. The outer annular cylindrical body 23D includes an annular groove 230D to be able to accommodate the inner annular cylindrical body 22D therein, and a spline fitting portion 231D connecting with the output shaft for the rear wheel. An inner peripheral surface of a groove wall of the annular groove 230D is connected in spline with the outer peripheral surface of the inner annular cylindrical body 22D.

The differential case 2E includes a case element 22E at the front output shaft side, a case element 23E at the rear output shaft side, an intermediate case element 24E and an end case element 25E. The differential case 2E is non-rotatably connected to the internal gear 2D and is accommodated in the transfer case 13 through a ball bearing 15. The differential case 2E is an annular cylindrical body including a first annular cylindrical portion and a second annular cylindrical portion accommodating the differential restricting mechanism 3 therein.

The case element 22E at the front output shaft side includes first to third element pieces 220E to 222E and is disposed at the front output shaft side of the differential case 2E. The first element piece 220E is disposed between the electromagnet 4A of the pressing mechanism 4 and the armature 4B and is formed by an annular cylindrical body made of magnetic material of soft iron etc. as a whole. The second element piece 221E is disposed out of outer peripheral of the first element piece 220E and is formed by an annulus ring body made of magnetic material of soft iron etc. as a whole. The third element piece 222E is disposed between the first element piece 220E and the second element piece 221E and is formed by an annulus ring body made of nonmagnetic material of stainless steel etc. as a whole for connection of the case element.

The case element 23E at the rear output shaft side is disposed at the rear output shaft side of the differential case 2E and is connected to the intermediate case element 24E through a connecting pin 16. The case element 23E is an annular cylindrical body with a bottom and opens to the rear output shaft side. On the bottom surface of the case element 23E at the rear output shaft side is mounted a thrust washer 19 faced to the free top edge surface of the gear portion 20B of the plural planetary gears 2B through a thrust washer 18. The thrust washer 18 is mounted on the planet carrier 2A.

The intermediate case element 24E is inserted between the case element 22E at the front output shaft side and the case element 23E at the rear output shaft side and is disposed at an intermediate portion of the differential case 2E along the axis direction. The intermediate case element 24E is connected to the case element 22E at the front output shaft side by a bolt 17 and is formed by an annular cylindrical body opening to right and left direction as a whole. The intermediate case element 24E with the case element 22E at the front output shaft side is constructed to accommodate the differential restricting mechanism 3 as the first annular cylindrical portion therein. Between an inner peripheral surface of the intermediate case element 24E and an outer peripheral surface of the annular cylindrical body 22C is disposed the clutches of the differential restricting mechanism 3 connecting the sun gear 2C and the internal gear 2D to be able to transmit torque each other.

The end case element 25E is a ring bolt screwing into an opening inner peripheral surface of the case element 23E at the rear output shaft side and is disposed out of an outer periphery of the cylindrical body 23D. The end case element 25E is constructed to secure the internal gear 2D to the differential case 2E by pressing the cylindrical bodies 22D, 23D to a bottom surface of the case element 23E at the rear output shaft side and constructed with the case element 23E at the rear output shaft side to accommodate a part of the differential mechanism 2. Besides, while the third embodiment of the present invention has been described that the part of the differential mechanism 2 is accommodated within the end case element 25E and the case element 23E at the rear output shaft side, the invention is not limited to the construction but it may be constructed by accommodating whole construction of the differential mechanism 2.

As a part of an operation of the third embodiment of the present invention, next differential restricting torque is occurred at the sun gear 2C and the internal gear 2D as the output shafts by energizing the electromagnet 4A of the pressing mechanism 4 in the stage that engine torque is input into the planet carrier 2A.

When the electromagnet 4A of the pressing mechanism 4 is energized, the magnetic circuit is built from the transfer case 13 through the case element 22E at the front output shaft side and the intermediate case element 24E of the differential case 2E to the armature 4B so that the armature 4B is moved to a direction of a electromagnet side by the magnetic force. By the movement of the armature 3B, the inner clutch plates 3A and the outer clutch plates 3B of the differential restricting mechanism 3 are pressed to the direction to the electromagnet side so that the inner clutch plates 3A and the outer clutch plates 3B are relatively moved to approach each other thereby to be engaged frictionally. The frictional engagement completes the torque transmission between the differential case 2E and the sun gear 2C, that is to say between the sun gear 2C and the internal gear 2D through the inner clutch plates 3A and the outer clutch plates 3B. Thereby, the differential restricting torque is generated at the sun gear 2C and the internal gear 2D.

[Effects of the Third Embodiment]

The differential apparatus for the vehicle according to the third embodiment of the present invention achieves the same effects to that of the first embodiment of the present invention.

Fourth Embodiment of the Present Invention

The fourth embodiment of the differential apparatus for the vehicle according to the present invention will be explained in referring to FIG. 12 hereinafter. A numeral in FIG. 12 same to the numeral in FIG. 11 is the same member to be identified by the same numeral and eliminated the explanation in detail.

Figure 12:
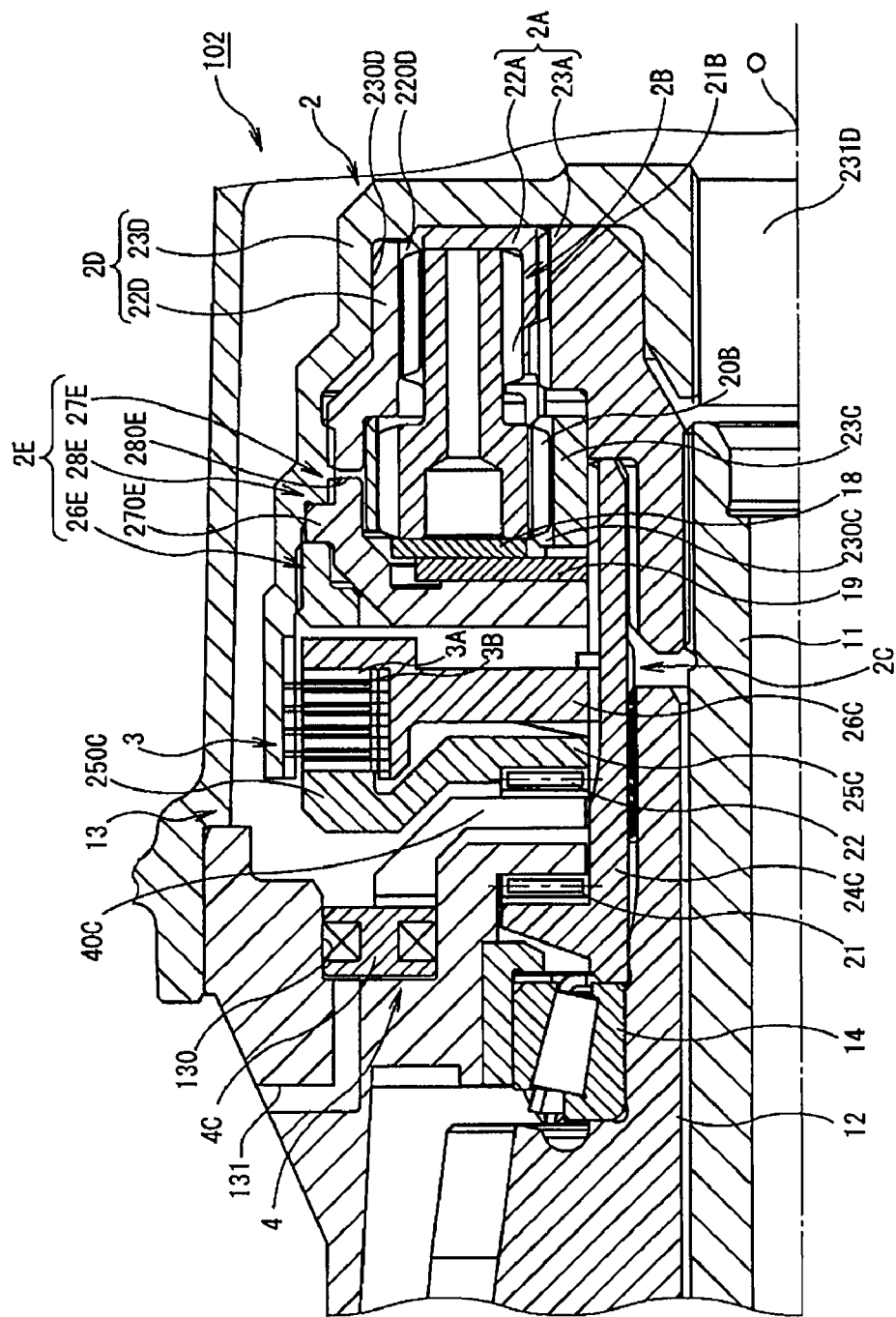
FIG. 12 is an cross sectional diagram explaining the differential apparatus for the vehicle according to fifth embodiment of the present invention.

As shown in FIG. 12, it is for a feature of the differential apparatus 102 for the vehicle of the fourth embodiment to provide the pressing mechanism 4 having a piston 4C outputting pressing force by being moved to axial direction of the sun gear 2C and the internal gear 2D, and a pressing force transmitting portion 205C of a third gear element 25C by which the sun gear 2C of the differential mechanism 2 transmits the pressing force of the piston 4C as operational force to the differential restricting mechanism 3 so that the sun gear 2C and the internal gear 2D are connected to be able to transmit the torque through the differential case 2E and the clutches of the differential restricting mechanism 3.

The sun gear 2C includes first to fourth gear element 23C to 26C and is connected to the unillustrated output shaft at the front wheel side through the front output gear 12.

The first gear element 23C has a gear portion 230C intermeshing with the gear portions 20B of the plural planetary gears 2B and is rotatably mounted around the rotational axis O as an axis line of the internal gear 2D. The first gear element 23C is constructed as an annulus ring body as a whole opening to two right and left directions of the gear axis of the sun gear 2C.

The second gear element 24C is rotatably disposed on the transfer case 13 through a needle bearing 21 inside the planet carrier 2A and connected in spline with an inner peripheral surface of the first gear element 23C. The second gear element 24C is constructed as an annular cylindrical body as a whole with a flange opening to two right and left directions of the gear axis of the sun gear 2C.

The third gear element 25C is a substantially annular body having the pressing force transmitting portion 250C and is disposed non-rotatably to an outer peripheral surface of the second gear element 24C. The third gear element 25C is rotatably mounted on a pressing portion 40C through a needle bearing 22 and constructed to transmit the pressing force received by the pressing force transmitting portion 250C from the pressing portion 40C to the differential restricting mechanism 3 as the operational force.

The fourth gear element 26C is a substantially annular body having a pressing force receiving portion 260C faced to the pressing force transmitting portion 250C through the clutch plates of the differential restricting mechanism 3 and is provided with a predetermined space to the third gear element 25C along its axial direction. The fourth gear element 26C is non-rotatably disposed on an outer peripheral surface of the second gear element 24C.

The front output gear 12 is disposed out of the outer peripheral surface of the input shaft 11 and is rotatably supported within the transfer case 13 through a taper roller bearing 14. In the transfer case 13 are equipped a pressure chamber 130 forwarding and retracting the piston 4C along the axial direction of the sun gear 2C and of the internal gear 2D, and a supplying passage 131 introducing oil pressure to the pressure chamber 130. The pressure chamber 130 and the supplying passage 131 are constructed to be function as the pressing mechanism 4 with the piston 4C. The piston 4C has the pressing portion 40C exerting the pressing force to the third gear element 25C and is constructed to make a function as an output portion of the pressing mechanism 4.

The differential case 2E includes a case element 26E at the front output shaft side, a case element 27E at the rear output shaft side and an outer peripheral case element 28E and is non-rotatably connected with the internal gear 2D. The differential case 2E is rotatably accommodated within the transfer case 13 around the rotational axis O and constructed with the first cylindrical portion accommodating a part of the differential mechanism 3 therein and the second cylindrical portion accommodating the differential restricting mechanism 3 therein.

The case element 26E at the front output shaft side is a ring bolt as a whole and is disposed at the front output shaft side of the differential case 2E. The case element 26E is screwed into the inner peripheral surface of the outer peripheral case element 28E.

The case element 27E at the rear output shaft side is an annular cylindrical body having a flange portion 270E at its peripheral surface and is disposed at the rear output shaft side of the differential case 2E. An outer peripheral surface of the case element 27E is connected in spline with the inner peripheral surface of the outer peripheral case element 28E.

The outer peripheral case element 28E has a stepped portion 280E receiving press contacting force or combining force of the case element 26E at the front output shaft side through the flange portion 270E of the case element 27E at the rear output shaft side and is provided on the cylindrical body 23D of the internal gear 2D as a body. The outer peripheral case element 28E is constructed as an annular cylindrical body opening to two right and left directions along an axial direction of the differential case 2E and is constructed to accommodate therein the case element 26E at the front output shaft side and the case element 27E at the rear output shaft side with the part of the differential mechanism 2 and the differential restricting mechanism 3. The case element 27E at the rear output shaft side is connected in spline with an inner peripheral surface of the outer peripheral case element 28E. Between the inner peripheral surface of the outer peripheral case element 28E and the outer peripheral surface of the fourth gear element 26C of the sun gear 2C is disposed the clutches of the differential restricting mechanism 3 connecting the sun gear 2C and the internal gear 2D in the state to be able to transmit torque each other. Besides, while the fourth embodiment of the present invention has been described that the part of the differential mechanism 2 is accommodated within the outer peripheral case element 28E, the invention is not limited to the construction but it may be constructed by accommodating whole construction of the differential mechanism 2.

As a part of an operation of the fourth embodiment of the present invention, next differential restricting torque is occurred at the sun gear 2C and the internal gear 2D as the output shaft by introducing oil pressure to the supplying passage 131 in the stage that engine torque is input into the planet carrier 2A.

When oil pressure is introduced to the supplying passage 131, the oil pressure acts on the piston 4C in the pressure chamber 130 to move the piston 4C with the pressing portion 40C to the third gear element 25C. By the movement of the piston 4C, the pressing portion 40C presses the third gear element 25C to the side of the differential restricting mechanism 3 so that the pressing force is transmitted to the inner clutch plates 3A and the outer clutch plates 3B of the differential mechanism 3 through the third gear element 25C. Thereby, the inner clutch plates 3A and the outer clutch plates 3B of the differential mechanism 3 are pressed to the direction to a side of the fourth gear element 26C so that the inner clutch plates 3A and the outer clutch plates 3B are relatively moved to approach each other, thereby to be engaged frictionally. The frictional engagement completes the torque transmission between the differential case 2E and the sun gear 2C, that is to say between the sun gear 2C and the internal gear 2D through the inner clutch plates 3A and the outer clutch plates 3B. Thereby, the differential restricting torque is generated at the sun gear 2C and the internal gear 2D.

[Effects of the Fourth Embodiment]

The differential apparatus for the vehicle according to the fourth embodiment of the present invention achieves the same effects to that of the first embodiment of the present invention.

Fifth Embodiment of the Present Invention

The fifth embodiment of the differential apparatus for the vehicle according to the present invention will be explained in referring to FIG. 13 and FIG. 14 hereinafter. A numeral in FIGS. 13, 14 same to the numeral in FIGS. 1 to 12 is the same member to be identified by the same numeral and eliminated the explanation in detail.

Figure 13:
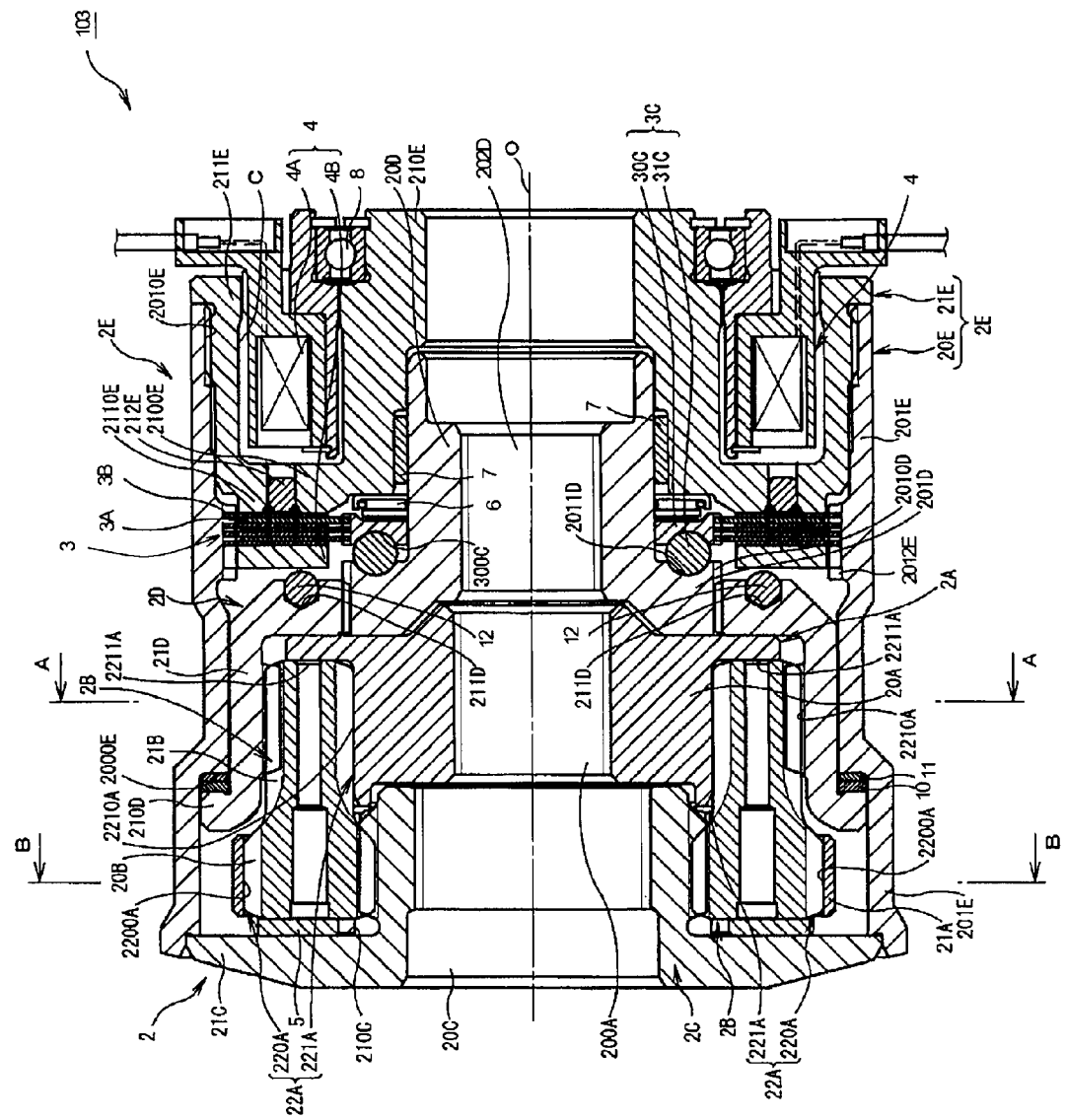
FIG. 13 is an oblique disassembling drawing explaining the differential apparatus for the vehicle according to the fifth embodiment of the present invention.

As shown in FIG. 13, it is for a feature of the differential apparatus 103 for the vehicle of the fifth embodiment to provide the differential restricting mechanism 3 having the boss portion 20D movable against the other of the output gears, that is against the internal gear 2D.

As shown in FIG. 13, from an outer peripheral surface of the sun gear 2C is extended a flange portion 21C positioned at an opposite side to a planet carrier side. On the flange portion 21C is provided a fourth gear supporting surface 210C, as a supporting surface at a gear side, supporting slidably the free edge of the top end face of the gear portions 20B of the plural planetary gears 2B along its axis direction.

The boss portion 20D is as shown in FIG. 13 an annular cylindrical body and is disposed opposite to the sun gear 2C through the planet carrier 2A along the rotational axis O. On an inner peripheral surface of the boss portion 20D is provided a spline fitting portion 202D connecting movably with the output shaft at the rear wheel side. A flange portion 201D is provided in one side of the boss portion 20D at its planet carrier side and has an end face faced to an end face opposite to the other end surface of the planet carrier 2A at the sun gear side. On an outer peripheral surface of the flange portion 201D is provided a spline fitting portion 2010D around the axis of the internal gear 2D. And also, on the flange portion 201D are formed a plurality of cam recesses 2011D opening to opposite side of the flange portion 201D from the planet carrier at a predetermined distance along a circumferential direction. Each cam recess 2011D has a cam groove having a changeable depth along circumferential direction same to a cam recess 300C as shown in FIG. 14 and cam followers 31C roll on the cam groove.

Figure 14:
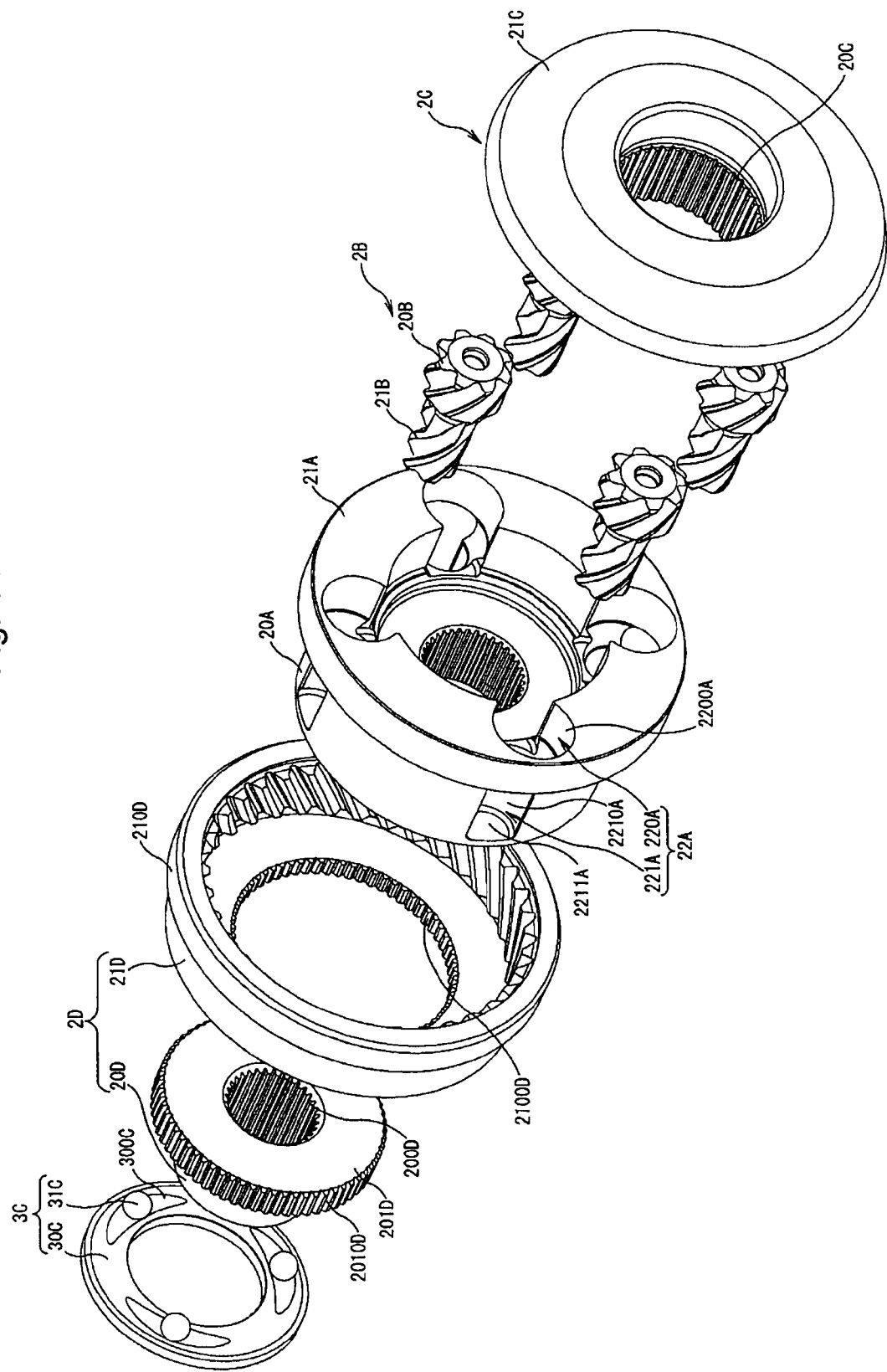
FIG. 14 is an oblique disassembling and partially cross sectional drawing explaining a differential apparatus for a vehicle according to fifth embodiment of the present invention.

As shown in FIG. 14, the gear portion 21D includes an annular cylindrical portion having in its inner peripheral surface a helical gear intermeshing with the gear portions 21B of the plural planetary gears 2B, and a bottom portion extending to inside direction from one side surface of the annular cylindrical portion and having in its central part a penetrating hole. The gear portion 21D is an annular cylindrical body as a whole with the bottom and has a spline fitting portion 2100D forming at an inner peripheral surface of the gear portion 21D over a width of the bottom portion of the gear portion 21D along the rotational axis O. The spline fitting portion 2100D intermeshes with the spline fitting portion 2010D of the boss portion 20D without pressing fit into the spline fitting portion 2100D to rotate the boss portion 20D with the gear portion 21D. Based on this spline fitting and the spline fitting between the spline fitting portion 202D of the boss portion 21D and the output shaft, the boss portion 20D is movable relatively to the gear portion 21D by pressing force generated by a cam mechanism 3C described hereinafter.

As shown in FIG. 13, on an outer peripheral surface of the gear portion 21D is provided a flange 210D positioned at an end portion of the gear portion 21D opposite to a boss portion side and functioned as one thrust force receiving portion faced to the flange portion 21C of the sun gear 2C. A plurality of recesses 211D are formed on the bottom portion of the gear portion 21D to open from its end face opposite to the planet carrier side and positioned at a predetermined distance along a circumferential direction. In each of the recesses 211D is respectively installed a ball 6 of a non-magnetic material such as stainless steel etc. with exposing a part of the ball in order to prevent any axial movement of the armature 4B.

The cylindrical portion 201E of the front case 20E has in its inner peripheral surface a stepped portion 2000E faced to the flange portion 210D of the gear portion 21D of the internal gear 2D through washers 7, 8 as the other thrust force receiving portion at the other side of the gear portion 21D. The stepped portion 2000E is constructed to receive thrust force generated at the gear portion 21D of the internal gear 2D by the intermeshing of the internal gear 2D with the gear portions 21B of the plural planetary gears 2B.

The inner clutch plates 3A and the outer clutch plates 3B operate to connect and disconnect between the differential case 2E and a cam 30C of the cam mechanism 3C in order to transmit rotational force of the sun gear 2C of the differential case 2E to the cam 30C. The inner clutch plates 3A and the outer clutch plates 3B are alternatively disposed at faced position each other along the rotational axis O and are made of annular frictional plates. The inner clutch plates 3A intermesh in spline with the outer peripheral surface of the cam member 30C and the outer clutch plates 3B intermesh in spline with the spline fitting portion 2011E of the cylindrical portion 201E of the front case 20E. A number of each of the inner clutch plates 3A and the outer clutch plates 3B in the fifth embodiment can be reduced to three less than a numeral five or six of those in the first to fourth embodiments because of an amplifying function of the cam mechanism 3C for the pressing force.

The cam mechanism 3C includes the cam 3C rotated by receiving the rotational force from the differential case 2E and the cam followers 31C generating the pressing force by the rotation of the cam 30C, and is disposed between an inner edge surface of the rear case 21E and the flange portion 201D of the boss portion 20D of the internal gear 2D. The cam 30C has a plurality of the cam recesses 300C faced to the cam recesses 2011D of the boss portion 20D and the number of plural cam recesses 300C is three same to that of the cam recesses 2011D. The cam 30C is installed peripherally on the boss portion 20D of the internal gear 2D and supported rotatably by a needle bearing 11 on an inner end face of the first element 210E. Each of the cam followers 31C is respectively inserted between each of bottoms of the cam recesses 300C of the cam 30C and each of bottoms of the cam recesses 2011D of the flange portion 201D of the internal gear 2D and formed as a spherical ball as a whole. The cam followers 31C are constructed to impart the pressing force generated by the rotation of the cam 30C to the boss portion 20D of the internal gear 2D along the axial direction of the gears.

The operation of the fifth embodiment of the present invention will be described partially hereinafter. When the engine torque is input to the planet carrier 2A, next 1 or 2 differential restricting torque is generated at the output gears of the sun gear 2C and the internal gear 2D as explained hereinafter.

1. Where the plural planetary gears 2B are rotated for self-rotation around its own axis during the torque acts on, because each of tooth edge faces of the gear portions 20B and the gear portions 21B of the plural planetary gears 2B slides on the first gear supporting surface 2200A and the second gear supporting surface 2210A of the first accommodating hole 220A and the second accommodating hole 221A of the planet carrier 2A and also because each of axial top end faces of the gear portions 21B of the plural planetary gears 2B slides on the third gear supporting surface 2211A of the second accommodating hole 221A of the planet carrier 2A, there occurs frictional resistance between tooth edges of the first gear supporting surface 2200A/the second gear supporting surface 2210A and the plural planetary gears 2B and between the third gear supporting surface 2211A and the axial top end faces of the plural planetary gears 2B, so that the differential restricting torque is generated at the sun gear 2C and the internal gear 2D by these frictional forces.

2. On the other hands, by the rotation of the plural planetary gears 2B for self-rotation around each of their axes, thrust force is generated on each of the intermeshing engagement surfaces between the plural planetary gears 2B and the sun gear 2C/the internal gear 2D along the rotational axis O. In this situation, when the plural planetary gears 2B are moved to approach to the flange portion 21C of the sun gear 2C and the sun gear 2D and the internal gear 2D are moved to the output mechanism side. At this moment, each of top end faces of the gear portions 20B of the plural planetary gears 2B is pressed on the fourth gear supporting surface 210C of the flange 21C of the sun gear 2C so that the frictional resistance is generated between the fourth gear supporting surface 210C of the flange 21C and the axial top end faces of the plural planetary gears 2B through the thrust washer 5. Thereby, the differential restricting torque is generated at the sun gear 2C and the internal gear 2D by this second frictional resistance. And also, the flange portion 210D of the gear portion 21D of the internal gear 2D is pressed on the stepped portion 2000E of the front case 20E of the differential case 2E through the thrust washers 7, 8 so that another frictional resistance is generated between the stepped portion 2000E of the differential case 2E and the flange portion 210D of the internal gear 2D through the thrust washers 7, 8. Thereby, the differential restricting torque is also generated at the sun gear 2C and the internal gear 2D by this another second frictional resistance.

Where the electromagnet 4A of the pressing mechanism 4 is excited, the magnetic circuit is closed through the front case 20E, the rear case 21E and the armature 4B so that the magnet force moves the armature 4B to the rear case side, that is the electromagnet side. By the movement of the armature 4B, the inner clutch plates 3A and the outer clutch plates 3B of the differential restricting mechanism 3 are pressed to the rear case side so that the inner clutch plates 3A and the outer clutch plates 3B are approached relatively each other to be contacted in frictional engagement. By this frictional engagement, the cylindrical portion 201E of the front case 20E of the differential case 2E and the cam 30C of the cam mechanism 3C are connected under the condition to be able to transmit the torque so that the rotational force of the sun gear 2C and the differential case 2E is transmitted to the cam mechanism 3C. By this transmission of the rotational force to the cam mechanism 3C, the rotational force of the sun gear 2C is transformed to the pressing force along the gear axis direction, and the pressing force is transmitted to the sun gear 2C through the boss portion 20D of the internal gear 2D and the carrier base 20A of the planet carrier 2A. In this occasion, if it were happened to occur that thrust force generated by the intermeshing between the gear portions 21B of the plural planetary gears 2B and the internal gear 2D would act to apart the internal gear 2D from the clutches 3A, 3B to tend to countervail pressing force generated by the cam mechanism 3C, however, the thrust force generated by the intermeshing between the gear portions 21B and the internal gear 2D is received by the supporting surface of the flange portion 21C of the sun gear 2C and the pressing force along the axial direction is absorbed the spline engagement so that the pressing force along the axial direction is not transferred directly to the intermeshing point between the gear portion 21B of the plural planetary gears 2B and the internal gear 2D in concerning about the axial direction of the rotational axis O. Thereby, the thrust force, generated by the intermeshing between the gear portions 20B of the plural planetary gears 2B and the sun gear 2C and the intermeshing between the gear portions 21B of the plural planetary gears 2B and the internal gear 2D, and the pressing force generated by the cam mechanism 3C along the gear axial direction are not countervailed, therefore it is obtained the differential restricting force efficiently.

[Effects of the Fifth Embodiment]

The differential apparatus for the vehicle according to the fifth embodiment of the present invention achieves next effects in addition to the same effects to those explained in items 1, 3 and 4 of the first embodiment of the present invention.

5. The thrust force, generated by the intermeshing between the plural planetary gears 2B and the sun gear 2C and the intermeshing between the plural planetary gears 2B and the internal gear 2D, and the pressing force generated by the cam mechanism 3C along the gear axial direction are not countervailed, therefore it is obtained the differential restricting force efficiently.

6. The number of the inner clutch plates 3A and the outer clutch plates 3B is reduced so that a longitudinal length of the differential case 2E along its axis is shortened, thereby reducing a total length of the whole apparatus.

While the invention has been described in detail with reference to the preferred embodiment, it will be apparent to those skilled in the art that the invention is not limited to the present embodiments, and that the invention may be realized in various other embodiments within the scope of the claims. For example, next items are possible for other embodiments.

1. While each of the first to fifth embodiments of the present invention is described that the plural planetary gears 2B having the gear portions 20B and the gear portions 21B intermeshing with the sun gear 2C and the internal gear 2D respectively are four gears accommodated in the gear accommodating and supporting portion 22A of the planet carrier 2A, the invention is not limited to the construction but it may be constructed by other number of the plural planetary gears in the planet carrier 2A.

2. While each of the first to fifth embodiments of the present invention is described that the gear portions 20B, 21B are helical gears having the different pitch diameters D1, D2 as the input gear and a pair of helical gears of the sun gear 2C and the internal gear 2D as the output gear intermeshing with the helical gears of the gear portions 20B, 21B, the invention is not limited to the construction but it may be constructed that plural pair of gear portions 20B, 21B are non-rotatably connected, each of pair of gear portion 20B, 21B is individual helical gear having the different pitch diameters D1, D2 as the input gear and a pair of helical gears of the sun gear 2C and the internal gear 2D as the output shafts intermesh with the helical gears of each of the plural pair of the gear portion 20B, 21B. And it may be constructed that the input gears are plural pairs of spur gears having the different pitch diameters and the output gears are a pair of spur gears intermeshing with each of plural pair of spur gears.

3. While each of the first to fifth embodiments of the present invention is described that the equation of D3/D1<D4/D2 is established in the pitch diameters of the gear portions 20B, 21B of the plural planetary gears 2B as input gears and the pitch diameters of the sun gear 2C and the internal gear 2D as output gears, the invention is not limited to the construction but it may be constructed that the equation of D3/D1=D4/D2 is established in the pitch diameters of the gears.

And also, it may be constructed that the equation of D3/D1<D4/D2 is established in the pitch diameters of the gear portions 20B, 21B of the plural planetary gears 2B as input gears and the pitch diameters of the sun gear 2C and the internal gear 2D as output gears.

4. While the fifth embodiments of the present invention is described that the pressing force generated by the cam mechanism 3C along the gear axis is transmitted to the plural planetary gears 2B and the sun gear 2C, the invention is not limited to the construction but it may be constructed that the pressing force generated by the cam mechanism 3C along the gear axis is transmitted to the plural planetary gears and the internal gear or to the plural planetary gears and one of the sun gear and the internal gear. In other words, the pressing force from the cam mechanism along the gear axis should act on at least one gear input gear and the pair of output gears except for the output gear having the boss portion movable along the gear axis.

5. While each of the first to fifth embodiments of the present invention is described for the differential apparatus for the vehicle having the planetary gear mechanism as the differential mechanism 2, the invention is not limited to the construction but it may be the differential apparatus for the vehicle having another gear mechanism of which the input gear and the output gear are intermeshed where each axis of the input gear and the output gear is perpendicular each other.

What is claimed is:

1. A differential apparatus for a vehicle, comprising:
a differential mechanism having
a carrier rotated about the axial direction of the differential apparatus by driving torque from a driving source,
an input gear rotating with said carrier and capable of self-rotation around the axis thereof, and
a pair of output gears distributing a rotational force of said carrier to a pair of output shafts by receiving the rotational force of said carrier from said input gear, wherein said carrier is disposed between said pair of output gears in the axial direction, and wherein the pair of output gears are able to rotate differentially, and wherein friction sufficient to restrict the differential rotation of said pair of output gears is generated between said input gear and said carrier by the self-rotation of said input gear; and
a clutch provided for selectively mutually connecting said output gears for torque transmission between said output gears, whereby a differential action of the differential mechanism is restricted, wherein the clutch includes clutch plates mounted directly to one of said output gears.

2. The differential apparatus according to claim 1 wherein the input gear is mounted to said carrier to slide with respect to said carrier during self-rotation around the axis thereof.

3. The differential apparatus according to claim 2 wherein the input gear is mounted to said carrier to apply a thrust force to said carrier during self-rotation around the axis thereof.

4. The differential apparatus according to claim 1 wherein the input gear is mounted to said carrier to slide with respect to said carrier, during self-rotation around the axis thereof, at a surface of said carrier that is at one of a radially inner or radially outer side of said input gear.

5. A differential apparatus for a vehicle according to claim 1, wherein:
said input gear has a large gear portion, and a small gear portion that is smaller than the large gear portion, intermeshing with said pair of output gears respectively; and
each of said large gear portion and said small gear portion has a different pitch diameter.

6. A differential apparatus for a vehicle according to claim 5, wherein:
each of said large gear portion and said small gear portion is a helical gear having the same helical direction.

7. A differential apparatus for a vehicle according to claim 5, wherein:
one of said pair of output gears intermeshes with said large gear portion having a large pitch diameter; and
the other of said pair of output gears intermeshes with said small gear portion having a small pitch diameter.

8. A differential apparatus for a vehicle according to claim 5, wherein:
said input gear is a planetary gear;
said one of said pair of output gears is a sun gear; and
said the other of said pair of output gears is an internal gear.

9. A differential apparatus for a vehicle according to claim 8, wherein:
an equation of $D3/D1 < D4/D2$ is established where a pitch diameter of said sun gear is set to be a dimension of $D1$, a pitch diameter of said internal gear is set to be a dimension of $D2$, a large pitch diameter of said large gear portion is set to be a dimension of $D3$, and a small pitch diameter of said small gear portion is set to be a dimension of $D4$.

10. A differential apparatus for a vehicle according to claim 8, wherein:
said sun gear has an annular cylindrical portion having a rotational axis as a central axis thereof;
said annular cylindrical portion is constructed by a differential case accommodating said differential mechanism and said clutch.

11. A differential apparatus for a vehicle according to claim 1, wherein:
said one of said pair of output gears has a movement restricting member restricting any movement of said the other of said pair of output gears to a side of said clutch.

12. A differential apparatus for a vehicle according to claim 1, wherein:
an internal gear has an annular cylindrical portion having a rotational axis as its central axis;
said annular cylindrical portion is constructed by a differential case having a first annular cylindrical portion to accommodate at least a part of said differential mechanism and a second annular cylindrical portion to accommodate said clutch.

* * * * *